United States Patent
Zheng et al.

(10) Patent No.: US 10,491,263 B2
(45) Date of Patent: Nov. 26, 2019

(54) DATA TRANSMISSION METHOD AND DATA TRANSMISSION DEVICE

(71) Applicant: Huawei Technologies Co., Ltd., Shenzhen (CN)

(72) Inventors: Juan Zheng, Beijing (CN); Zuomin Wu, Beijing (CN); Lei Guan, Beijing (CN); Qiang Li, Shenzhen (CN); Sha Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

(21) Appl. No.: 15/588,417

(22) Filed: May 5, 2017

(65) Prior Publication Data
US 2017/0237463 A1 Aug. 17, 2017

Related U.S. Application Data

(63) Continuation of application No. PCT/CN2014/090655, filed on Nov. 7, 2014.

(51) Int. Cl.
*H04B 1/7087* (2011.01)
*H04W 56/00* (2009.01)
(Continued)

(52) U.S. Cl.
CPC ........... *H04B 1/7087* (2013.01); *H04L 5/001* (2013.01); *H04W 16/14* (2013.01); *H04W 56/00* (2013.01);
(Continued)

(58) Field of Classification Search
None
See application file for complete search history.

(56) References Cited

U.S. PATENT DOCUMENTS

| 2010/0110983 A1 | 5/2010 | Fu et al. |
| 2013/0336133 A1 | 12/2013 | Carbonelli et al. |

(Continued)

FOREIGN PATENT DOCUMENTS

| CN | 102017738 A | 4/2011 |
| CN | 102739379 A | 10/2012 |

(Continued)

OTHER PUBLICATIONS

"Initial Discussion on Identified Functionalities for LAA," 3GPP TSG RAN WG1 Meeting #78bis, Ljubljana, Slovenia, R1-144266, 3rd Generation Partnership Project, Valbonne, France (Oct. 6-10, 2014).

(Continued)

*Primary Examiner* — Mohamed A Kamara
*Assistant Examiner* — Saad Khawar
(74) *Attorney, Agent, or Firm* — Leydig, Voit & Mayer, Ltd.

(57) ABSTRACT

Embodiments of the present invention provide a data transmission method and a data transmission device. The data transmission device includes: a detection unit, configured to detect a first signal in a first cell; a determining unit, configured to determine a reference time point according to a first sequence of the detected first signal, where the reference time point is located in a first subframe of the first cell; where the determining unit is further configured to determine a position of a data channel according to the determined reference time point; and a receiving unit, configured to receive, according to the position of the data channel, control data and/or service data carried on the data channel. According to the embodiments of the present invention, resource utilization can be improved.

16 Claims, 13 Drawing Sheets

(51) Int. Cl.
*H04L 5/00* (2006.01)
*H04W 16/14* (2009.01)
*H04L 27/00* (2006.01)

(52) U.S. Cl.
CPC .......... *H04L 5/0044* (2013.01); *H04L 5/0048* (2013.01); *H04L 5/0053* (2013.01); *H04L 27/0006* (2013.01)

(56) References Cited

U.S. PATENT DOCUMENTS

| | | | |
|---|---|---|---|
| 2014/0044108 A1 | 2/2014 | Earnshaw et al. | |
| 2014/0112289 A1* | 4/2014 | Kim | H04W 16/14 370/329 |
| 2017/0353866 A1* | 12/2017 | Gou | H04L 5/0007 |

FOREIGN PATENT DOCUMENTS

| | | |
|---|---|---|
| CN | 103312650 A | 9/2013 |
| CN | 103348746 A | 10/2013 |
| CN | 103516657 A | 1/2014 |
| CN | 105592467 A | 5/2016 |
| WO | 2013006006 A2 | 1/2013 |
| WO | WO 2013138772 A1 | 9/2013 |
| WO | 2014111309 A1 | 7/2014 |
| WO | 2016072778 A1 | 5/2016 |

OTHER PUBLICATIONS

"Initial Discussion on Solutions for Identified LAA Functionalities," 3GPP TSG RAN WG1 Meeting #76bis, Ljubljana, Slovenia, R1-144267, 3rd Generation Partnership Project, Valbonne, France (Oct. 6-10, 2014).

"Solutions for required functionalities and design targets," 3GPP TSG RAN WG1 #78bis, Ljubljana, Slovenia, R1-144000, 3rd Generation Partnership Project, Valbonne, France (Oct. 6-10, 2014).

* cited by examiner

DATA TRANSMISSION METHOD AND DATA TRANSMISSION DEVICE

CROSS-REFERENCE TO RELATED APPLICATION

This application is a continuation of International Application No. PCT/CN2014/090655, filed on Nov. 7, 2014, the disclosure of which is hereby incorporated by reference in its entirety.

TECHNICAL FIELD

Embodiments of the present invention relate to the field of mobile communications, and in particular, to a data transmission method and a data transmission device.

BACKGROUND

A spectrum is a basis for wireless communication. Currently, for using of a spectrum, there is a design that allows a device in a Long Term Evolution (LTE) system and a device in a non-LTE system (for example, a Wireless Fidelity (Wireless Fidelity, WiFi) device) to jointly use an unauthorized or unlicensed (unlicensed) spectrum. Specifically, the LTE system may use the unlicensed spectrum independently or in a form of a secondary cell configuration. However, a problem urgently to be resolved is to seek a data transmission method that can ensure normal data communication between LTE devices while using the unlicensed spectrum efficiently.

SUMMARY

Embodiments of the present invention provide a data transmission method and a data transmission device, so that resource utilization can be improved.

According to a first aspect, a data transmission device is provided and includes: a detection unit, configured to detect a first signal in a first cell; a determining unit, configured to determine a reference time point according to a first sequence of the detected first signal, where the reference time point is located in a first subframe of the first cell; where the determining unit is further configured to determine a position of a data channel according to the determined reference time point; and a receiving unit, configured to receive, according to the position of the data channel, control data and/or service data carried on the data channel.

With reference to the first aspect, in an implementation manner, the determining unit is specifically configured to determine the reference time point according to a one-to-one correspondence between sequence information of the first sequence and the reference time point.

With reference to the first aspect and the foregoing implementation manner of the first aspect, in another implementation manner, the determining unit is specifically configured to determine the reference time point according to an index of a symbol that is in the first cell and closest to a position of the first sequence.

With reference to the first aspect and the foregoing implementation manners of the first aspect, in another implementation manner, the determining unit is specifically configured to determine the reference time point according to an index of a symbol that is in a second cell and closest to a position of the first sequence, where the second cell and the first cell are deployed on different spectrum resources.

With reference to the first aspect and the foregoing implementation manners of the first aspect, in another implementation manner, the position of the first sequence includes a start time position of the first sequence or an end time position of the first sequence.

With reference to the first aspect and the foregoing implementation manners of the first aspect, in another implementation manner, the determining unit is specifically configured to: if a time length between the determined reference time point and an end boundary of the first subframe is not less than X1, determine that the position of the data channel is located in the first subframe, where X1 is a time length that is not less than 0.

With reference to the first aspect and the foregoing implementation manners of the first aspect, in another implementation manner, the determining unit is further configured to determine that a time length of a second signal is M1, where the second signal includes the first signal, and M1 is a minimum time length of the second signal.

With reference to the first aspect and the foregoing implementation manners of the first aspect, in another implementation manner, the determining unit is specifically configured to:

if a time length between the determined reference time point and an end boundary of the first subframe is less than X2, determine that the position of the data channel is located in a second subframe, where the second subframe is a next subframe adjacent to the first subframe; or if a time length between the determined reference time point and an end boundary of the first subframe is less than X2, determine that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

With reference to the first aspect and the foregoing implementation manners of the first aspect, in another implementation manner, the determining unit is further configured to: if the time length between the determined reference time point and the end boundary of the first subframe is not less than Y1, determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \le i < n$, $L_i < L_{i+1}$, and Y1 is a time length that is not equal to X2 and not less than 0.

With reference to the first aspect and the foregoing implementation manners of the first aspect, in another implementation manner, the determining unit is further configured to: if the time length between the determined reference time point and the end boundary of the first subframe is less than Y2, determine that a time length of a second signal is Z2, where the second signal includes the first signal, Z2 belongs to a length set, $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \le i < n$, $L_i' < L_{i+1}'$, and Y2 is a time length that is not equal to X2 and not less than 0.

With reference to the first aspect and the foregoing implementation manners of the first aspect, in another implementation manner, the determining unit is further configured to: if the time length between the determined reference time point and the end boundary of the first subframe is less than Y3, determine that a time length of a second signal is Z3, where the second signal includes the first signal, Z3 is less than M2, an end time position of the second signal is located at the end boundary of the first subframe, M2 is a preset minimum time length of the second signal, and Y3 is a time length that is not equal to X2 and not less than 0.

With reference to the first aspect and the foregoing implementation manners of the first aspect, in another implementation manner, the determining unit is specifically configured to: if a time length between the determined reference time point and an end boundary of the first subframe is less than X3, and the time length between the determined reference time point and the end boundary of the first subframe is greater than Y4, determine that the position of the data channel is located in the first subframe, where X3 and Y4 are time lengths that are not less than 0, and Y4 is not greater than X3.

With reference to the first aspect and the foregoing implementation manners of the first aspect, in another implementation manner, the data channel carries data scheduling information of a second subframe of the first cell, where the second subframe is a next subframe adjacent to the first subframe.

With reference to the first aspect and the foregoing implementation manners of the first aspect, in another implementation manner, a correspondence exists between the reference time point and the position of the data channel, each reference time point corresponds to one index, and each index corresponds to one position of the data channel.

With reference to the first aspect and the foregoing implementation manners of the first aspect, in another implementation manner, the position of the data channel includes at least one of the following positions: a position of a control data channel or a position of a service data channel.

With reference to the first aspect and the foregoing implementation manners of the first aspect, in another implementation manner, the first cell is a cell on an unlicensed spectrum.

According to a second aspect, a data transmission device is provided and includes: a determining unit, configured to determine a reference time point, where the reference time point is located in a first subframe of a first cell; where the determining unit is further configured to determine a sending position of a first signal according to the reference time point; and a sending unit, configured to send the first signal in the sending position of the first signal; where the determining unit is further configured to determine a position of a data channel according to the reference time point; and the sending unit is further configured to send, in the position of the data channel, control data and/or service data carried on the data channel.

With reference to the second aspect, in an implementation manner, the determining unit is specifically configured to determine the reference time point according to an index of a symbol closest to a time point at which a spectrum resource of the first cell is preempted.

With reference to the second aspect and the foregoing implementation manner of the second aspect, in another implementation manner, the determining unit is specifically configured to determine the reference time point according to an index of a symbol that is in a second cell and closest to a time point at which a spectrum resource of the first cell is preempted, where the second cell and the first cell are deployed on different spectrum resources.

With reference to the second aspect and the foregoing implementation manners of the second aspect, in another implementation manner, the first signal includes or carries a first sequence; and the determining unit is further configured to determine the first sequence according to the reference time point.

With reference to the second aspect and the foregoing implementation manners of the second aspect, in another implementation manner, the determining unit is specifically configured to determine the first sequence according to a one-to-one correspondence between sequence information of the first sequence and the reference time point.

With reference to the second aspect and the foregoing implementation manners of the second aspect, in another implementation manner, the determining unit is specifically configured to: if a time length between the reference time point and an end boundary of the first subframe is not less than X1, determine that the position of the data channel is located in the first subframe, where X1 is a time length that is not less than 0.

With reference to the second aspect and the foregoing implementation manners of the second aspect, in another implementation manner, the determining unit is further configured to determine that a time length of a second signal is M1, where the second signal includes the first signal, and M1 is a minimum time length of the second signal.

With reference to the second aspect and the foregoing implementation manners of the second aspect, in another implementation manner, the determining unit is specifically configured to:

if a time length between the reference time point and an end boundary of the first subframe is less than X2, determine that the position of the data channel is located in a second subframe, where the second subframe is a next subframe adjacent to the first subframe; or if a time length between the reference time point and an end boundary of the first subframe is less than X2, determine that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

With reference to the second aspect and the foregoing implementation manners of the second aspect, in another implementation manner, the determining unit is further configured to: if the time length between the reference time point and the end boundary of the first subframe is not less than Y1, determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i, 1 \leq i < n, L_i < L_{i+1}$, and Y1 is a time length that is not equal to X2 and not less than 0.

With reference to the second aspect and the foregoing implementation manners of the second aspect, in another implementation manner, the determining unit is further configured to: if the time length between the reference time point and the end boundary of the first subframe is less than Y2, determine that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall k, 1 \leq i < n, L_i' < L_{i+1}'$, and Y2 is a time length that is not equal to X2 and not less than 0.

With reference to the second aspect and the foregoing implementation manners of the second aspect, in another implementation manner, the determining unit is further configured to: if the time length between the reference time point and the end boundary of the first subframe is less than Y3, determine that a time length of a second signal is Z3, where the second signal includes the first signal, Z3 is less than M2, an end time position of the second signal is located at the end boundary of the first subframe, M2 is a minimum time length of the second signal, and Y3 is a time length that is not equal to X2 and not less than 0.

With reference to the second aspect and the foregoing implementation manners of the second aspect, in another implementation manner, the determining unit is specifically configured to: if a time length between the reference time point and an end boundary of the first subframe is less than X3, and the time length between the reference time point and the end boundary of the first subframe is greater than Y4, determine that the position of the data channel is located in the first subframe, where X3 and Y4 are time lengths that are not less than 0, and Y4 is not greater than X3.

With reference to the second aspect and the foregoing implementation manners of the second aspect, in another implementation manner, the data channel carries data scheduling information of a second subframe of the first cell, where the second subframe is a next subframe adjacent to the first subframe.

With reference to the second aspect and the foregoing implementation manners of the second aspect, in another implementation manner, a correspondence exists between the reference time point and the position of the data channel, each reference time point corresponds to one index, and each index corresponds to one position of the data channel.

With reference to the second aspect and the foregoing implementation manners of the second aspect, in another implementation manner, the position of the data channel includes at least one of the following positions: a position of a control data channel or a position of a service data channel.

With reference to the second aspect and the foregoing implementation manners of the second aspect, in another implementation manner, the first cell is a cell on an unlicensed spectrum.

According to a third aspect, a data transmission method is provided and includes: detecting a first signal in a first cell; determining a reference time point according to a first sequence of the detected first signal, where the reference time point is located in a first subframe of the first cell; determining a position of a data channel according to the determined reference time point; and receiving, according to the position of the data channel, control data and/or service data carried on the data channel.

With reference to the third aspect, in an implementation manner, the determining a reference time point according to the detected first sequence includes: determining the reference time point according to a one-to-one correspondence between sequence information of the first sequence and the reference time point.

With reference to the third aspect and the foregoing implementation manner of the third aspect, in another implementation manner, the determining a reference time point according to the detected first sequence includes: determining the reference time point according to an index of a symbol that is in the first cell and closest to a position of the first sequence.

With reference to the third aspect and the foregoing implementation manners of the third aspect, in another implementation manner, the determining a reference time point according to the detected first sequence includes: determining the reference time point according to an index of a symbol that is in a second cell and closest to a position of the first sequence, where the second cell and the first cell are deployed on different spectrum resources.

With reference to the third aspect and the foregoing implementation manners of the third aspect, in another implementation manner, the position of the first sequence includes a start time position of the first sequence or an end time position of the first sequence.

With reference to the third aspect and the foregoing implementation manners of the third aspect, in another implementation manner, the determining a position of a data channel according to the determined reference time point includes: if a time length between the determined reference time point and an end boundary of the first subframe is not less than X1, determining that the position of the data channel is located in the first subframe, where X1 is a time length that is not less than 0.

With reference to the third aspect and the foregoing implementation manners of the third aspect, in another implementation manner, the method further includes: determining that a time length of a second signal is M1, where the second signal includes the first signal, and M1 is a minimum time length of the second signal.

With reference to the third aspect and the foregoing implementation manners of the third aspect, in another implementation manner, the determining a position of a data channel according to the determined reference time point includes: if a time length between the determined reference time point and an end boundary of the first subframe is less than X2, determining that the position of the data channel is located in a second subframe, where the second subframe is a next subframe adjacent to the first subframe; or if a time length between the determined reference time point and an end boundary of the first subframe is less than X2, determining that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

With reference to the third aspect and the foregoing implementation manners of the third aspect, in another implementation manner, the method further includes: if the time length between the determined reference time point and the end boundary of the first subframe is not less than Y1, determining that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \leq i < n$, $L_i < L_{i+1}$, and Y1 is a time length that is not equal to X2 and not less than 0.

With reference to the third aspect and the foregoing implementation manners of the third aspect, in another implementation manner, the method further includes: if the time length between the determined reference time point and the end boundary of the first subframe is less than Y2, determining that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \leq i < n$, $L_i' < L_{i+1}'$, and Y2 is a time length that is not equal to X2 and not less than 0.

With reference to the third aspect and the foregoing implementation manners of the third aspect, in another implementation manner, the method further includes: if the time length between the determined reference time point and the end boundary of the first subframe is less than Y3, determining that a time length of a second signal is Z3, where the second signal includes the first signal, Z3 is less than M2, an end time position of the second signal is located at the end boundary of the first subframe, M2 is a preset minimum time length of the second signal, and Y3 is a time length that is not equal to X2 and not less than 0.

With reference to the third aspect and the foregoing implementation manners of the third aspect, in another implementation manner, the determining a position of a data channel according to the determined reference time point includes: if a time length between the determined reference time point and an end boundary of the first subframe is less than X3, and the time length between the determined reference time point and the end boundary of the first subframe is greater than Y4, determining that the position of the data channel is located in the first subframe, where X3 and Y4 are time lengths that are not less than 0, and Y4 is not greater than X3.

With reference to the third aspect and the foregoing implementation manners of the third aspect, in another implementation manner, the data channel carries data scheduling information of a second subframe of the first cell, where the second subframe is a next subframe adjacent to the first subframe.

With reference to the third aspect and the foregoing implementation manners of the third aspect, in another implementation manner, a correspondence exists between the reference time point and the position of the data channel, each reference time point corresponds to one index, and each index corresponds to one position of the data channel.

With reference to the third aspect and the foregoing implementation manners of the third aspect, in another implementation manner, the position of the data channel includes at least one of the following positions: a position of a control data channel or a position of a service data channel.

With reference to the third aspect and the foregoing implementation manners of the third aspect, in another implementation manner, the first cell is a cell on an unlicensed spectrum.

According to a fourth aspect, a data transmission method is provided and includes: determining a reference time point, where the reference time point is located in a first subframe of a first cell; determining a sending position of a first signal according to the reference time point, and sending the first signal in the sending position of the first signal; and determining a position of a data channel according to the reference time point, and sending, in the determined position of the data channel, control data and/or service data carried on the data channel.

With reference to the fourth aspect, in an implementation manner, the determining a reference time point includes: determining the reference time point according to an index of a symbol closest to a time point at which a spectrum resource of the first cell is preempted.

With reference to the fourth aspect and the foregoing implementation manner of the fourth aspect, in another implementation manner, the determining a reference time point includes: determining the reference time point according to an index of a symbol that is in a second cell and closest to a time point at which a spectrum resource of the first cell is preempted, where the second cell and the first cell are deployed on different spectrum resources.

With reference to the fourth aspect and the foregoing implementation manners of the fourth aspect, in another implementation manner, the first signal includes or carries a first sequence; and the method further includes: determining the first sequence according to the reference time point.

With reference to the fourth aspect and the foregoing implementation manners of the fourth aspect, in another implementation manner, the determining the first sequence according to the reference time point includes: determining the first sequence according to a one-to-one correspondence between sequence information of the first sequence and the reference time point.

With reference to the fourth aspect and the foregoing implementation manners of the fourth aspect, in another implementation manner, the determining a position of a data channel according to the reference time point includes: if a time length between the reference time point and an end boundary of the first subframe is not less than X1, determining that the position of the data channel is located in the first subframe, where X1 is a time length that is not less than 0.

With reference to the fourth aspect and the foregoing implementation manners of the fourth aspect, in another implementation manner, the method further includes: determining that a time length of a second signal is M1, where the second signal includes the first signal, and M1 is a minimum time length of the second signal.

With reference to the fourth aspect and the foregoing implementation manners of the fourth aspect, in another implementation manner, the determining a position of a data channel according to the reference time point includes:

if a time length between the reference time point and an end boundary of the first subframe is less than X2, determining that the position of the data channel is located in a second subframe, where the second subframe is a next subframe adjacent to the first subframe; or if a time length between the reference time point and an end boundary of the first subframe is less than X2, determining that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

With reference to the fourth aspect and the foregoing implementation manners of the fourth aspect, in another implementation manner, the method further includes: if the time length between the reference time point and the end boundary of the first subframe is not less than Y1, determining that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \leq i < n$, $L_i < L_{i+1}$, and Y1 is a time length that is not equal to X2 and not less than 0.

With reference to the fourth aspect and the foregoing implementation manners of the fourth aspect, in another implementation manner, the method further includes: if the time length between the reference time point and the end boundary of the first subframe is less than Y2, determining that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \leq i < n$, $L_i' < L_{i+1}'$, and Y2 is a time length that is not equal to X2 and not less than 0.

With reference to the fourth aspect and the foregoing implementation manners of the fourth aspect, in another implementation manner, the method further includes: if the time length between the reference time point and the end boundary of the first subframe is less than Y3, determining that a time length of a second signal is Z3, where the second signal includes the first signal, Z3 is less than M2, an end time position of the second signal is located at the end boundary of the first subframe, M2 is a minimum time length of the second signal, and Y3 is a time length that is not equal to X2 and not less than 0.

With reference to the fourth aspect and the foregoing implementation manners of the fourth aspect, in another implementation manner, the determining a position of a data channel according to the reference time point includes: if a time length between the reference time point and an end boundary of the first subframe is less than X3, and the time length between the reference time point and the end boundary of the first subframe is greater than Y4, determining that the position of the data channel is located in the first subframe, where X3 and Y4 are time lengths that are not less than 0, and Y4 is not greater than X3.

With reference to the fourth aspect and the foregoing implementation manners of the fourth aspect, in another implementation manner, the data channel carries data scheduling information of a second subframe of the first cell, where the second subframe is a next subframe adjacent to the first subframe.

With reference to the fourth aspect and the foregoing implementation manners of the fourth aspect, in another implementation manner, a correspondence exists between the reference time point and the position of the data channel, each reference time point corresponds to one index, and each index corresponds to one position of the data channel.

With reference to the fourth aspect and the foregoing implementation manners of the fourth aspect, in another implementation manner, the position of the data channel includes at least one of the following positions: a position of a control data channel or a position of a service data channel.

With reference to the fourth aspect and the foregoing implementation manners of the fourth aspect, in another implementation manner, the first cell is a cell on an unlicensed spectrum.

In the embodiments of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
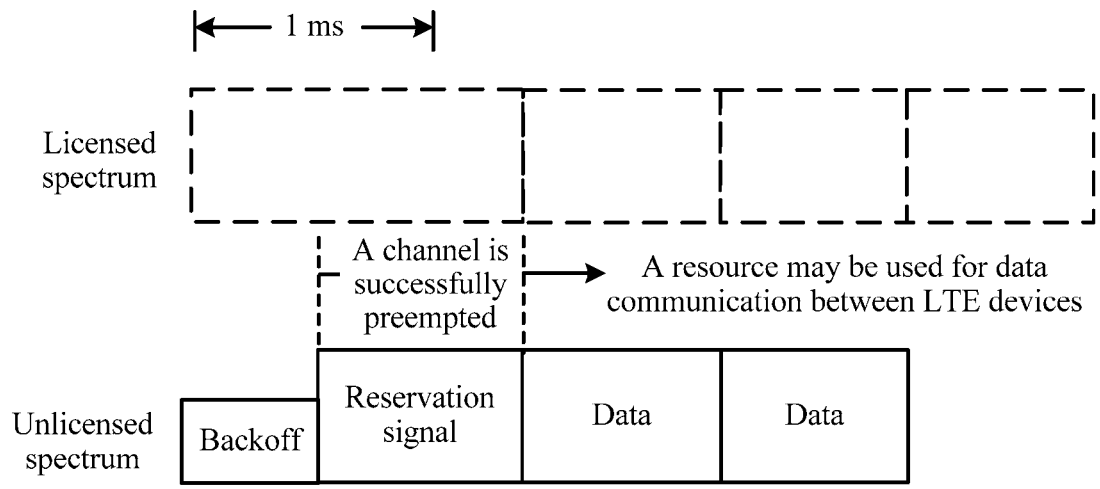
FIG. 1 is a schematic diagram of sending a reservation signal on a preempted unlicensed spectrum resource.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM, Global System of Mobile communication), a Code Division Multiple Access (CDMA, Code Division Multiple Access) system, a Wideband Code Division Multiple Access (WCDMA, Wideband Code Division Multiple Access Wireless), a general packet radio service (GPRS, General Packet Radio Service), and a Long Term Evolution (LTE, Long Term Evolution).

A user equipment (UE, User Equipment), also referred to as a mobile terminal (Mobile Terminal), a mobile user equipment, and the like, may communicate with one or more core networks through a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network; or may be a relay (Relay).

A base station may be a base station (BTS, Base Transceiver Station) in the GSM or CDMA, may also be a base station (NodeB) in the WCDMA, and may further be an evolved NodeB (eNB or e-NodeB, evolutional Node B) in the LTE, which is not limited in the present invention.

An application scenario of the embodiments of the present invention includes that the embodiments are applied to an LTE system for licensed-assisted access (Licensed-Assisted Access, LAA), that is, an LAA-LTE system. The LTE system for licensed-assisted access refers to an LTE system in which a licensed spectrum and an unlicensed spectrum are used together in a CA or non-CA manner. Specifically, the licensed spectrum, or a carrier included in the licensed spectrum, or a cell working on the licensed spectrum is used as a primary serving cell, and the unlicensed spectrum, or a carrier included in the unlicensed spectrum, or a cell working on the unlicensed spectrum is used as a secondary serving cell. The primary serving cell and the secondary serving cell may be deployed on a same site, or may not be deployed on a same site. There is an ideal backhaul path between the two serving cells.

However, the embodiments of the present invention are also not limited to the foregoing CA scenario, and may be further applied to other deployment scenarios, for example, a scenario in which there is no ideal backhaul path between the two serving cells (primary serving cell and secondary serving cell). Because of a great backhaul delay, it is possible that information cannot be quickly coordinated between the two serving cells.

In addition, independent deployment of the serving cell working on the unlicensed spectrum may also be considered. That is, the serving cell working on the unlicensed spectrum may directly provide an independent access function, and does not require assistance from the cell working on the licensed spectrum.

In the embodiments of the present invention, both the licensed spectrum and the unlicensed spectrum may include one or more carriers. Carrier aggregation is performed on the licensed spectrum and the unlicensed spectrum. This may include performing carrier aggregation on one or more carriers included in the licensed spectrum and one or more carriers included in the unlicensed spectrum.

The cell mentioned in the embodiments of the present invention may be a cell corresponding to a base station. For example, the cell may belong to a macro base station, or may belong to a base station corresponding to a small cell (small cell). Small cells herein may include a metro cell (Metro cell), a micro cell (Micro cell), a pico cell (Pico cell), a femto cell (Femto cell), and the like. These small cells have features of small coverage and low transmit power, and are used to provide a high-speed data transmission service.

In the embodiments of the present invention, concepts of a carrier and a cell in the LTE system are basically equivalent. For example, for UE, accessing a carrier is equivalent to accessing a cell. In the specification of the embodiments of the present invention, the concept of the cell is uniformly used for description.

According to an international spectrum white paper recently published by the Federal Communications Commission (Federal Communications Commission, FCC), unauthorized or unlicensed spectrum resources are more than authorized or licensed spectrum resources. Currently, a main technology used on the unlicensed spectrum is WiFi. However, WiFi is disadvantageous in terms of mobility, security, quality of service (Quality of Service, QoS), and simultaneous processing of multi-user scheduling. Therefore, applying LTE devices on the unlicensed spectrum may not only use the unlicensed spectrum resources efficiently, but also provide more effective radio access and meet growing requirements for mobile broadband services. In a future mobile communication scenario, an LTE device and a WiFi device simultaneously exist on the unlicensed spectrum. In order that the LTE device can maintain its advantages over WiFi in terms of mobility, security, quality of service, and simultaneous processing of multi-user scheduling even if the LTE device works on the unlicensed spectrum, one method is to aggregate the licensed spectrum and the unlicensed spectrum in the carrier aggregation (Carrier Aggregation, CA) manner. That is, in the CA manner, the LTE device may use the licensed spectrum as a primary component carrier (Primary Component Carrier, PCC) or a primary cell (Primary Cell, PCell), and use the unlicensed spectrum as a secondary component carrier (Secondary Component Carrier, SCC) or a secondary cell (Secondary Cell, SCell). In this way, the LTE device can use the licensed spectrum to inherit the conventional advantages of the LTE device used in wireless communication, for example, the advantages in terms of mobility, security, quality of service, and simultaneous processing of multi-user scheduling, and can also use the spectrum resources on the unlicensed spectrum.

There is no constraint on use of an unlicensed spectrum by a wireless communications system and an operator, that is, there is a case in which multiple operators of multiple communications systems all want to occupy a same spectrum. Therefore, to achieve fairness of spectrum usage by different wireless communications systems on the unlicensed spectrum, in some regions, wireless communications devices need to comply with specific regulations and rules when using the unlicensed spectrum. For example, in ETSI EN 301 893 published by the European Telecommunications Standards Institute (European Telecommunications Standards Institute, ETSI), rules such as listen before talk (Listen Before Talk, LBT) and channel bandwidth occupancy requirements are specified for using the unlicensed spectrum. As specified in ETSI EN 301 893, a wireless communications device needs to use the LBT rule before occupying an unlicensed spectrum for communication, that is, before using a channel, the device first needs to monitor whether the channel is idle or available. If the channel is available, the unlicensed spectrum resource may be used for data transmission, but a time of occupying the channel is limited. After the time of occupying the channel reaches a maximum limit, the device must release the unlicensed spectrum for a period of time, that is, data transmission on the unlicensed spectrum must be stopped for a period of time. Before using an unlicensed spectrum resource for data transmission next time, the device must monitor again whether the channel is available. The device may perform a clear channel assessment (Clear Channel Assessment, CCA) by performing energy detection, and determine whether the monitored channel is idle or available. As currently specified in ETSI EN 301 893, when using the unlicensed spectrum, the wireless communications device needs to meet a listen before talk mechanism requirement of frame based equipment (Frame Based Equipment, FBE) or listen before talk mechanism requirement of load based equipment (Load Based Equipment, LBE).

Therefore, in some regions such as Europe, if an LTE device wants to use the unlicensed spectrum to perform data communication, the LTE device needs to comply with the LBT rule. That is, the LTE device first needs to perform a CCA before using the unlicensed spectrum, and can send data only after determining that an unlicensed spectrum resource is available. On the other hand, to have more opportunities to preempt a spectrum resource, the LTE device may initiate listening at any time, and this is also allowed by the regulations and rules. That is, on the unlicensed spectrum, a time point at which the spectrum resource is available, which is determined by the LTE device, is also any time. In particular, the LTE device uses the LBT mechanism of the LBE. Correspondingly, because the LTE device can send the data after determining that the unlicensed spectrum resource is available (determining that the unlicensed spectrum resource is available, while meeting constraints of regulations), a time point at which the LTE device sends the data on the unlicensed spectrum is also any time. The LTE device may detect, in a manner of energy detection, whether an unlicensed spectrum resource is available. If the LTE device determines, by performing energy detection in a specified time range, that received energy is less than a particular threshold, the LTE device may determine that the unlicensed spectrum resource is available. On the other hand, the LTE device may also determine, in a manner of signal parsing, whether an unlicensed spectrum resource on a channel is available, for example, by detecting a signal that indicates that the unlicensed spectrum resource is occupied, or by detecting a network allocation vector (Network Allocation Vector, NAV). Herein, the NAV indicates a time of occupying the unlicensed spectrum by a device that occupies the unlicensed spectrum. Once another device detects the NAV, if the another device is not a target device served by the device that sends the NAV, the another device cannot send, in a time range indicated by the NAV, data on the unlicensed spectrum occupied by the device that sends the NAV. In addition, the LTE device may further determine, in the manner of energy detection and/or signal parsing, whether the unlicensed spectrum resource is available.

However, for the LTE system, because a determined time point at which an unlicensed spectrum resource is available is any time, a start time point for sending data is also any time. However, currently, data sending and receiving by an LTE device are both based on a subframe boundary. In this case, how to ensure normal data communication between LTE devices is a problem that needs to be considered for the LTE devices working on the unlicensed spectrum.

One manner does not require synchronization between the unlicensed spectrum and a reference time source. In this case, once an LTE device, for example, an LTE base station, seizes a usage opportunity on the unlicensed spectrum, the LTE device uses a time point at which the usage opportunity is currently seized as a subframe boundary, and performs data communication with another LTE device, for example, LTE UE. That is, in this case, time synchronization information on the unlicensed spectrum may be inconsistent with that provided by the reference time source. For example, a subframe boundary of the unlicensed spectrum is not aligned with a subframe boundary of the licensed spectrum, or time information on the unlicensed spectrum and the licensed spectrum may be asynchronous. Herein the reference time source may be a licensed spectrum aggregated with an unlicensed spectrum by CA aggregation, or a global positioning system (Global Positioning System, GPS), or a wired network clock synchronization protocol, for example, the IEEE 1588 protocol, or a synchronization source base station in radio-interface based synchronization (Radio-interface based synchronization, RIBS), and the synchronization source base station is a base station that may provide a synchronization signal for another base station. Using a reference time source that is a licensed spectrum aggregated with an unlicensed spectrum by CA aggregation as an example, in the embodiments of the present invention, that time information on the unlicensed spectrum and the licensed spectrum is asynchronous may include: a time unit boundary of the unlicensed spectrum and a time unit boundary of the licensed spectrum are not aligned or there is no fixed offset. Herein the time unit boundary may include an orthogonal frequency division multiplexing (Orthogonal Frequency Division Multiplexing, OFDM) symbol boundary, a timeslot (Slot) boundary, a subframe (Subframe) boundary, a radio frame (Radio Frame) boundary, a super frame (Super Frame) boundary, or the like.

However, a time position for data transmission on the unlicensed spectrum is determined according to an opportunity seized by the LTE device to use an unlicensed spectrum resource, and therefore is random. If time information of the unlicensed spectrum and time information provided by the reference time source are asynchronous, additional complexity is caused to a user in setting the time information of the unlicensed spectrum, and the asynchronization is disadvantageous to implementing some beneficial technologies on the unlicensed spectrum, for example, fast discovery, an enhanced multi-broadcast multi-service (Enhanced Multi-broadcast Multi-service, eMBMS), and an advanced receiver (Advanced Receiver).

Another manner is to keep synchronization between the unlicensed spectrum and a reference time source. In this case, a subframe boundary of the unlicensed spectrum may be determined according to time information provided by the reference time source. Herein the reference time source is the same as above, and is not described again herein. After an LTE device (for example, an LTE base station) seizes an opportunity to use the unlicensed spectrum, before a next subframe boundary arrives, the LTE device sends a reservation signal (padding), where the reservation signal indicates that the LTE device starts to perform data communication in a next subframe with another LTE device, for example, LTE user equipment (User Equipment, UE). Herein the data communication may include control data and service data communication.

FIG. 1 is a schematic diagram of sending a reservation signal (padding) on a preempted unlicensed spectrum resource.

A description is made by using that an LTE device sends a padding as an example. It is assumed that the LTE device already performs data communication on a licensed spectrum. As shown by an upper side of FIG. 1, it is assumed that a subframe with a time length of 1 ms is used as a transmission unit for data communication on the licensed spectrum.

A lower side of FIG. 1 indicates a signal transmission process on an unlicensed spectrum. For ease of comparison, absolute time coordinates of signals on the two spectrums on the upper side and lower side in FIG. 1 are synchronous. In the embodiments of the present invention, using a reference time source that is a licensed spectrum aggregated with an unlicensed spectrum by CA aggregation as an example, "synchronization" between different spectrums means that subframe boundaries of different spectrums are aligned or that there is a fixed offset.

In FIG. 1, a backoff (backoff) phase on the unlicensed spectrum indicates that the LTE device performs a CCA in the range, and determines, by performing energy detection and/or signal parsing, whether the currently detected unlicensed spectrum is available. If the currently detected unlicensed spectrum is available, the LTE device sends a reservation signal starting from determining successful preemption of a channel to arrival of a next subframe boundary. Herein the subframe boundary may indicate a start position of data channel transmission that can be detected by UE, or a start position of a control data channel that can be detected by UE. An advantage of this practice is that, after the LTE device, for example, an LTE base station, seizes an opportunity to use the unlicensed spectrum, and before the LTE base station transmits data to the UE, the LTE base station may further preempt the unlicensed spectrum, and may align time information of the unlicensed spectrum with the reference time source, for example, align the time information with a subframe boundary of the licensed spectrum. In this way, the LTE base station may use content carried by a control channel of the licensed spectrum to indicate a transmission format of a data channel of the unlicensed spectrum, and therefore, a quantity of blind detection of the UE may be reduced. Herein the blind detection includes detecting whether data channel transmission on the unlicensed spectrum starts.

Further, herein the subframe boundary may also be other time units, for example, a time unit that is used for data transmission and can be identified by the LTE device, for example, one OFDM symbol, a fractional OFDM symbol, and other time units that can be supported in the LTE system, for example, a reciprocal of a sampling rate in the LTE system.

In summary, the LTE base station may send a padding starting from seizing an opportunity to use an unlicensed spectrum to arrival of a next subframe boundary at which data can be scheduled.

If a padding is sent, the padding may indicate only that the LTE device seizes an opportunity to use the unlicensed spectrum, and does not carry a signal and/or a channel related to data scheduling, for example, a spectrum identifier of the unlicensed spectrum, an identity of a cell that uses an unlicensed spectrum resource to perform data transmission, a physical downlink control channel (Physical Downlink Control Channel, PDCCH), a physical control format indicator channel (Physical Control Format Indicator Channel, PCFICH), a physical hybrid automatic repeat indicator channel (Physical Hybrid ARQ Indicator Channel, PHICH), a physical broadcast channel (Physical Broadcast Channel, PBCH), a physical downlink shared channel (Physical Downlink Shared Channel, PDSCH), an enhanced physical downlink control channel (Enhanced Physical Downlink Control Channel, EPDCCH), a physical multicast channel (Physical Multicast Channel, PMCH), or a reference signal such as a primary synchronization signal (Primary Synchronization Signal, PSS), a secondary synchronization signal (Secondary Synchronization Signal, SSS), a cell-specific reference signal (Cell-specific Reference Signal, CRS), a UE-specific reference signal (UE-specific Reference Signal) used for PDSCH data demodulation, a demodulation reference signal (DeModulation Reference Signal, DM-RS) used for EPDCCH demodulation, a positioning reference signal (Positioning Reference Signal, PRS), a channel state information reference signal (Channel State Information Reference Signal, CSI-RS), or a discovery reference signal (Discovery Reference Signal, DRS). Alternatively, the padding may carry the foregoing signal and/or channel. However, another LTE device (for example, LTE UE) served by the LTE device sending the padding does not demodulate or receive the signal and/or channel carried by the padding. That is, one of features of the padding is that regardless of specific content carried by the signal, the another LTE device served by the LTE device sending the signal does not need to demodulate the signal, or further, the another LTE device served by the LTE device sending the signal may not receive the signal, and the signal that meets this feature may be referred to as a reservation signal. After sending the reservation signal is ended, the base station and the UE start to perform data communication. In this manner, because data communication between the base station and the UE starts from a next subframe, synchronization between the unlicensed spectrum and the reference time source (for example, the licensed spectrum) may be implemented.

However, because a purpose of the padding signal is only to occupy a channel but not to make a substantive contribution to data transmission, in a time period for sending the padding signal, an unlicensed spectrum resource that is already preempted is wasted, and resource utilization is reduced.

In addition, the foregoing solution does not consider adverse impact of a time position in which the backoff phase is ended on a position of the data channel. In other words, no matter in which position of the subframe the backoff phase is ended, the data channel starts to be transmitted from a start position of the next subframe. This also causes waste of an unlicensed spectrum resource.

Using the case in FIG. 1 as an example, if a time position in which the backoff phase is ended is just after a start time position of a subframe of a licensed spectrum resource, almost unlicensed spectrum resources of one subframe can be used only for sending a padding signal, and consequently, unlicensed spectrum resources with a length of one subframe are wasted.

Figure 2:
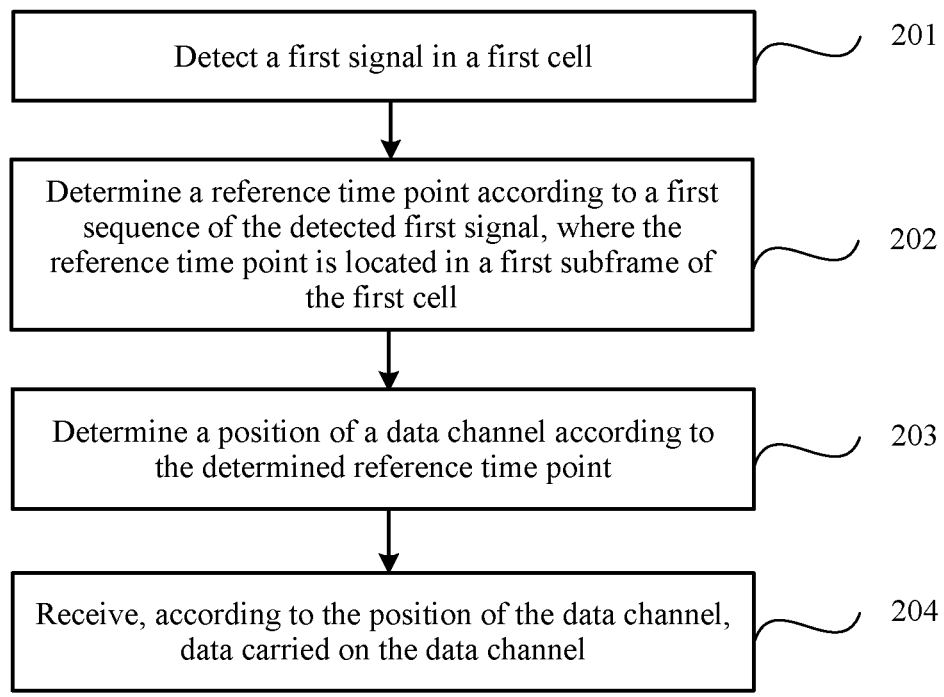
FIG. 2 is a schematic flowchart of a data transmission method according to an embodiment of the present invention.

FIG. 2 is a schematic flowchart of a data transmission method according to an embodiment of the present invention. The method in FIG. 2 is performed by a receive end (for example, an LTE device, such as an LTE base station or UE).

201. Detect a first signal in a first cell.

202. Determine a reference time point according to a first sequence of the detected first signal, where the reference time point is located in a first subframe of the first cell.

203. Determine a position of a data channel according to the determined reference time point, where the data channel is used to carry control data and/or service data.

204. Receive the data channel according to the position of the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

Specifically, in this embodiment of the present invention, a receive end detects a first signal sent on an unlicensed spectrum, determines a reference time point according to a first sequence of the detected first signal, and then determines a receiving position of a data channel according to a position of the reference time point in a subframe. In this way, a detection signal and a data channel are sent on a preempted unlicensed spectrum resource, the preempted unlicensed spectrum resource can be fully used, and resource utilization is improved.

It should be noted that, similar attributes such as "first", "second", and "third" before terms in the specification of the present invention are not used to limit a sequence of the terms, but used only for distinguishing. For example, "first signal" and "second signal" mean that the two signals may represent different signal carriers. In other words, the two signals may also represent a same signal carrier, but anyway, the two signals do not mean that the first signal is located before the second signal in time. If a sequence relationship exists definitely, it is particularly pointed out in the specification of the present invention.

The first cell may be a cell on the unlicensed spectrum. The first signal may be used to indicate that a transmit end has preempted a spectrum resource of the first cell on the unlicensed spectrum. A preemption operation in this embodiment of the present invention may include a preemption operation performed according to a backoff process in FIG. 1, or may include preemption operations in other forms, for example, an unlicensed spectrum resource pattern (pattern) preset according to a protocol specification. For example, the first signal may indicate, to the receive end in an explicit or implicit manner, that the transmit end has preempted a spectrum resource on the unlicensed spectrum. In an embodiment, the explicit manner may be that the first signal may carry a specific flag (flag) field or a similar indication field, and different flag values indicate whether an unlicensed spectrum resource is preempted. In another embodiment, the implicit manner may be that sending the first signal or not is used to indicate whether the transmit end has preempted an unlicensed spectrum resource. For example, an action of sending the first signal indicates that the transmit end has preempted an unlicensed spectrum resource. In addition, the first signal may be used for other purposes, for example, used for synchronizing or transmitting other useful information.

The first cell in this embodiment of the present invention may be a cell deployed on the unlicensed spectrum. One of functions of the first signal is that the receive end determines, by detecting the first signal, whether the first cell that sends the first signal has data transmission on the spectrum on which the first cell is deployed. For example, when the first cell is deployed on the unlicensed spectrum, the receive end may determine, by detecting the first signal, whether the first cell starts to use the unlicensed spectrum or whether the first cell seizes an opportunity to use a spectrum resource on the unlicensed spectrum. The first signal may be a reference signal, for example, may be one of the following reference signals: a PSS, an SSS, a CRS, a CSI-RS, a PRS, a DRS, a DMRS, or a UE specific reference signal used for PDSCH demodulation. In another embodiment, the first signal in this embodiment of the present invention may also be a channel carrying data, for example, one of the following channels: a PDCCH, a PDSCH, an EPDCCH, a PMCH, a PBCH, a PCFICH, a PHICH, or the like.

The first signal includes or carries the first sequence. For example, the first sequence has N different sequence forms, and no matter which sequence form is used for the first sequence, the first sequence may be included in the first signal. UE may determine, by detecting the first signal, the sequence form of the first sequence included in the first signal, and this may be referred to as the first sequence of the detected first signal. More specifically, for example, a PSS in an existing LTE system is used as the first signal; in this case, the first sequence may be Zadoff-Chu sequences forming the PSS; and the UE may determine, by detecting the PSS, which Zadoff-Chu sequence, namely, which first sequence, is carried in the detected PSS. For another example, an SSS in the existing LTE system is used as the first signal; in this case, the first sequence may be 168 sequences forming the SSS, and any one in the 168 sequences is a combination of two binary sequences having a length of 31. In addition, that the first signal includes the first sequence may also be that a part of the first signal includes the first sequence. For example, the first signal occupies multiple time units (for example, A OFDM symbols) in time, and a signal carrying the first sequence is a part of the first signal, that is, from a time perspective, occupies a part of multiple time units occupied by the first signal in time (for example, B OFDM symbols, where B is less than or equal to A, and time positions corresponding to the B OFDM symbols are a non-null subset of time positions corresponding to the A OFDM symbols). In addition, the first signal may also be a channel including or carrying the first sequence. In this embodiment of the present invention, the term signal or channel may indicate a carrier that is used to carry specific information or data and occupies a specific time-frequency resource.

The data channel may be independent of the first signal, for example, sent after the first signal. The data channel and the first signal may also occupy a same time resource, for example, are multiplexed on the time resource in orthogonal mode such as frequency division, space division, or code division. A time resource occupied by the first signal may also be a part of a time resource occupied by the data channel. For example, a time resource occupied by the data channel is three OFDM symbols, and specifically, a third OFDM symbol to a fifth OFDM symbol in a subframe. In this case, the time resource occupied by the first signal may be any one or more of the three OFDM symbols. The data channel may be used to carry control data and/or service data. An example of the control data includes but is not limited to data carried by a PDCCH, an EPDCCH, a PBCH, a PHICH, or a PCFICH. An example of the service data includes but is not limited to data carried by a PDSCH or a PMCH. In addition, in this embodiment of the present invention, a detection operation of the receive end on the first signal may be real-time blind detection, for example, detecting whether the first signal exists during signal reception, or may be first buffering the first signal and then detecting the first signal.

In the following embodiment, for ease of description, a case in which the transmit end is an LTE base station and the receive end is LTE UE is mainly used as an example for description, that is, a case in which the first signal and the data channel are a downlink signal and channel is used as an example for description. A person skilled in the art easily understands that a case in which the first signal and the data channel are an uplink signal and channel may be designed or modified similarly. Such a design or modification still falls within the scope of this embodiment of the present invention.

To implement data communication between the first cell and the UE on the unlicensed spectrum, once the first cell seizes an opportunity to use the unlicensed spectrum, before performing control data and/or service data transmission with the UE, the first cell may first send other control information used for detecting control data and/or service data, or before the UE demodulates control data and/or service data communication, the UE needs to first learn other control information used for detecting control data and/or service data. For example, the other control information may include information that enables the UE to determine that the first cell seizes an opportunity to use the unlicensed spectrum, a cell identity of the first cell, synchronization information of the first cell, a public land mobile network (Public Lands Mobile Network, PLMN) identifier of the first cell, or more generally, necessary control information supporting data transmission (including control data transmission and/or service data transmission) in the current LTE system, for example, information carried on a PBCH or information carried in a system information block (System Information Block, SIB). The other control information may be carried in a signal and/or a channel. For example, the synchronization information of the first cell may be carried by a synchronization signal sent by the first cell. In this embodiment of the present invention, a carrier carrying the other control information is referred to as a second signal, or may be referred to as a second channel. For example, the second signal may be in a form of a preamble (preamble), and the preamble carries the other control information. However, the form or a specific name of the second signal is not limited in this embodiment of the present invention. In this embodiment of the present invention, the term "signal" is mainly used for description. However, this may also be extended to a case in which the term "channel" is used, and the extension falls within the scope of this embodiment of the present invention. The second signal sent by the first cell may occupy multiple time units in time. Herein the time unit may be a length of one OFDM symbol, or may occupy a length of a fractional OFDM symbol, or may be another length representation form related to a length of an OFDM symbol, for example, a reciprocal Ts of a sampling rate, where 15360*Ts=0.5 milliseconds, or more generally, may be an integer multiple of a time unit that can be identified by the LTE system. To implement normal data communication between the first cell and the UE on the unlicensed spectrum, from a perspective of a synchronization requirement meeting normal data communication, the second signal may occupy X OFDM symbols in time, where X may be any positive integer. For example, assuming that X is set to 4 to implement a requirement of frequency synchronization between the first cell and the UE on the unlicensed spectrum, a signal carried by a first OFDM symbol may enable the UE to learn whether the first cell has seized an opportunity to use a spectrum resource on the unlicensed spectrum. In this case, the UE may learn, by detecting energy of the first OFDM symbol or parsing (demodulating) the signal carried by the first OFDM, whether the first cell has seized an opportunity to use a spectrum resource on the unlicensed spectrum. Certainly, the time length occupied by the second signal in time may be determined according to a met function provided by the second signal.

the detected first signal may include a detected signal carrying the first sequence, where the signal carrying the first sequence is a part of the first signal.

The determining a reference time point according to the first sequence of the detected first signal may specifically include at least one of the following manners: determining the reference time point according to a time position of the signal carrying the first sequence; determining the reference time point according to a time position of the signal carrying the first sequence and a correspondence between the signal carrying the first sequence and a time position of the first signal; or determining the reference time point according to a time position of the signal carrying the first sequence and a relative time relationship between the signal carrying the first sequence and the reference time point. The following uses specific embodiments for description.

Optionally, in an embodiment, the determining a reference time point according to the detected first sequence in step 202 may be: determining the reference time point according to a one-to-one correspondence between sequence information of the first sequence and the reference time point.

In other words, a one-to-one correspondence may exist between the sequence information of the first sequence and the reference time point (for example, in a form of a table). This helps to determine the corresponding reference time point according to the sequence information of the detected first sequence.

The first sequence is designed to indicate the reference time point of the first cell on the unlicensed spectrum. As described above, the reference time point may be indicated by a position of an OFDM symbol, or may be indicated by a position of a fractional OFDM symbol, or more generally, indicated by an integer multiple of Ts, or indicated by an integer multiple of a time unit that can be identified by the LTE system.

In an embodiment of the present invention, assuming that reference time points are different OFDM symbol positions included in a subframe, different OFDM symbol positions may be indicated by different OFDM symbol indexes. For example, a correspondence between an OFDM symbol position and an OFDM symbol index may be shown in the following Table 1, where the symbol index is an example of the sequence information.

TABLE 1

Example of a correspondence between symbol index and symbol position in a subframe
A subframe

| | Symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| Symbol position | First symbol | Second symbol | Third symbol | Fourth symbol | Fifth symbol | Sixth symbol | Seventh symbol | Eighth symbol | Ninth symbol | Tenth symbol | Eleventh symbol | Twelfth symbol | Thirteenth symbol | Fourteenth symbol |

The first signal may be a part of the second signal, or may be just the second signal. For example, the first signal may include only the first OFDM symbol of the second signal in time. The UE may determine, by detecting the first signal, whether the first cell has seized an opportunity to use a spectrum resource on the unlicensed spectrum.

Correspondingly, the reference time point and a length of the second signal are then determined according to the first sequence of the detected first signal. For another example, the first signal is just the second signal. The first sequence of In another embodiment of the present invention, the reference time point may be indicated by a position of a fractional OFDM symbol. A position of a fractional OFDM symbol (for example, a position of a ¼ OFDM symbol) may be determined jointly according to an index of an OFDM symbol and a position (or an index) of the fractional OFDM symbol in the OFDM symbol, or may be determined according to positions (or indexes) of all fractional OFDM symbols sorted in a time unit, where the time unit may be a subframe, a timeslot, a radio frame, or another time unit that can be identified by another LTE UE, for example, an integer multiple of a reciprocal Ts of a sampling rate.

Specifically, the following describes a case in which a reference time point is indicated by a position of an OFDM symbol. According to Table 1, a reference time point in a subframe has a maximum of 14 states. Then a maximum of 14 different first sequences may be used for indication. Once the first cell preempts a spectrum resource on the unlicensed spectrum, the first cell may determine the reference time point according to a relationship between a time position of the preempted spectrum resource on the unlicensed spectrum and a time position of a reference time source, and then may determine a start sending position of the first signal according to the reference time point, for example, use the determined reference time point as the start sending position of the first signal. At the same time, the first cell determines the first sequence according to the one-to-one correspondence between the reference time point and the sequence information of the first sequence, and adds the first sequence to the first signal for sending.

Figure 3A:
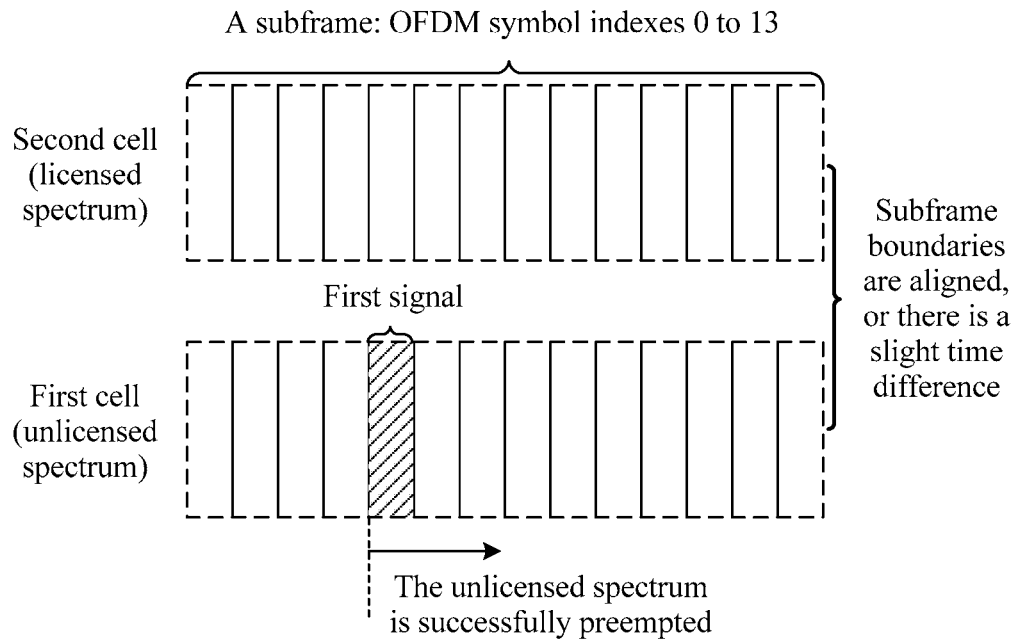
FIG. 3a and FIG. 3b are schematic diagrams of determining a sending position of a first signal according to an embodiment of the present invention.
Figure 3B:
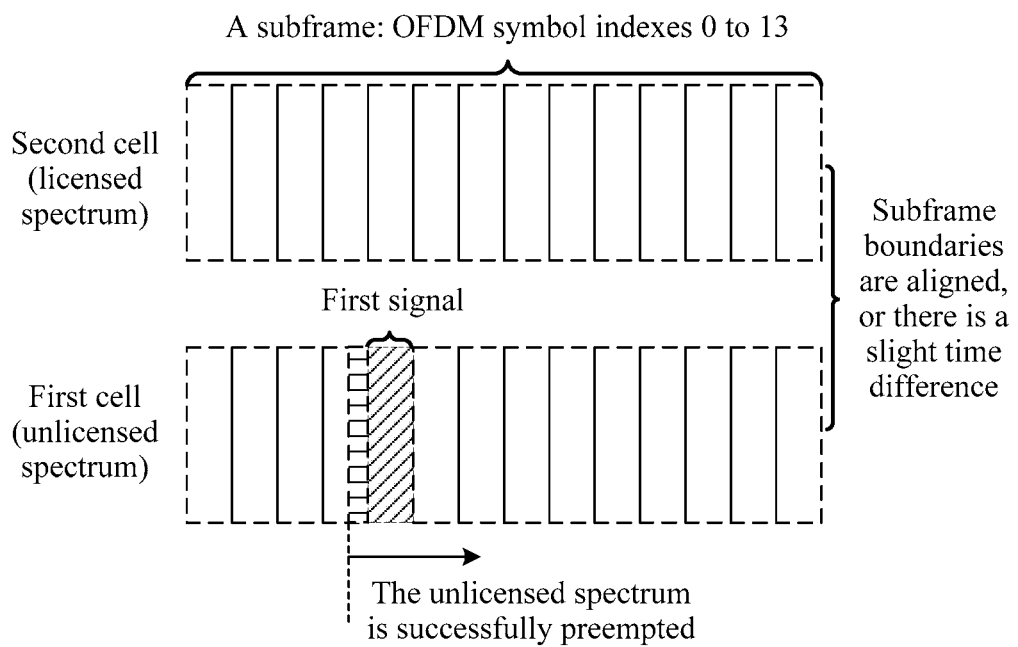

FIG. 3a and FIG. 3b are schematic diagrams of determining the sending position of the first signal according to an embodiment of the present invention.

In examples of FIG. 3a and FIG. 3b, it is assumed that the reference time source comes from a second cell, where the second cell is a cell aggregated with the first cell by CA aggregation. The second cell and the first cell may be deployed on a same base station, or may be deployed on different base stations. In addition, subframe boundaries of the second cell and the first cell are aligned, or there is a slight time difference, for example, 260 nanoseconds. In this way, the second cell may determine a symbol position of the second cell according to a symbol position of the first cell.

If a time point at which the first cell successfully seizes an opportunity to use a spectrum resource on the unlicensed spectrum is a boundary of an OFDM symbol, as shown in FIG. 3a, for example, the first cell determines, at an end boundary of a fourth OFDM symbol, that a spectrum resource on the unlicensed spectrum may be used, the first cell may determine that the start sending position of the first signal is located at a start boundary of a fifth OFDM symbol, or that transmission of a first symbol of the first signal in time may start from a fifth OFDM symbol.

If a time point at which the first cell successfully seizes an opportunity to use a spectrum resource on the unlicensed spectrum is not a boundary of an OFDM symbol, as shown in FIG. 3b, the first cell sends a padding (reservation signal) before the fifth OFDM symbol starts to send the first signal and after the spectrum resource on the unlicensed spectrum is successfully preempted, where the reservation signal may be a part of the first signal. In an extended sense, if a time point at which the first cell successfully seizes an opportunity to use a spectrum resource on the unlicensed spectrum may be indicated by a time supported by the system, for example, an integer quantity of OFDM symbol boundaries, or a fractional OFDM symbol boundary, the first cell may directly send the first signal after successfully preempting the unlicensed spectrum; however, if the time point may not be indicated by a time supported by the system, the first cell may send a padding before sending the first signal and after determining that the unlicensed spectrum is available. In the embodiment in FIG. 3b, although the padding is sent, a time occupied by the sent padding is very short, and does not exceed a length of one symbol or one fractional symbol. Therefore, there is little impact on resource utilization.

At the transmit end, for example, an LTE base station side, the first cell determines the reference time point, and then determines the first sequence according to a one-to-one correspondence between the reference time point and the first sequence, and further determines content to be sent in the first signal. For example, it is assumed that the first signal occupies a length of one OFDM symbol in time, and that a used signal is a PSS. In the LTE system, Zadoff-Chu sequences forming a PSS have four different forms (the current LTE system uses three of the forms). Therefore, the first sequence of the first signal may have a maximum of four different sequence forms, and may indicate four different reference time points.

In an embodiment of the present invention, in a subframe, from a perspective of an OFDM symbol index, the reference time point has 14 different states.

In another embodiment, if OFDM symbol indexes are classified, for example, OFDM symbol indexes in a subframe are classified into four types, it may be considered that there are four types of reference time points. The first cell may determine the sequence form of the first sequence according to a correspondence between the determined reference time points and sequences forming the PSS, and further determine the content to be sent in the first signal.

For another example, the first signal occupies a length of two OFDM symbols in time, and a signal carried by the first OFDM symbol is used by the UE to determine that the first cell has seized an opportunity to use a spectrum resource on the unlicensed spectrum. For example, the UE may use the PSS, and determine, by performing energy detection and/or signal parsing on the PSS, whether the first cell has seized an opportunity to use a spectrum resource on the unlicensed spectrum. Content sent in a signal (for example, an SSS) carried by the second OFDM symbol corresponds to the reference time point one one-to-one basis. That is, the content sent in the signal carried by the second OFDM symbol is the first sequence. In this case, although the first sequence is only a part of the first signal, the UE can also detect the first sequence by detecting the first signal. In a typical LTE system, sequences forming an SSS have 168 different sequence forms in total. Therefore, 14 different sequence forms are selected from the sequences forming the SSS and may be used to indicate 14 different reference time points.

The first cell may determine, according to the determined reference time point, for example, the start sending position of the first signal, a sending position of the first sequence included in the first signal. In this example, the first cell may determine the reference time point according to a relationship between the time point at which the first cell seizes the opportunity to use the unlicensed spectrum and synchronization information of the second cell. In this example, the sending position of the first sequence is located in a second OFDM symbol position of the first signal, and then an appropriate sequence is selected according to a correspondence between the sending position of the first sequence and different sequence forms forming the SSS, and is used as content sent in the signal carried by the second OFDM symbol of the first signal.

The first cell may determine its own synchronization information in other manners, for example, by using the synchronization information of the first cell, in addition to the synchronization information of the second cell. The synchronization information of the first cell may come from a GPS or a wired network synchronization protocol, or may be obtained by listening to a synchronization reference signal of another cell.

In this manner, on a UE side, the UE detects the first signal according to a time unit that may indicate the reference time point. As described above, the reference time point may be indicated by a position of an OFDM symbol, or may be indicated by a position of a fractional OFDM symbol, or more generally, indicated by a time unit that may be supported by the LTE system, for example, an integer multiple of a reciprocal Ts of a sampling rate. These indication forms may all be considered as positions of the reference time point in the first subframe.

For example, a case in which the reference time point is indicated by a position of an OFDM symbol is described. In one case, the UE detects, by using all possible sequence forms of the first sequence, whether the signal of the first cell includes the first sequence, and if the first sequence is included, further determines the form of the first sequence, and then determines the reference time point according to a correspondence between the sequence form of the first sequence and the reference time point. Alternatively, the UE may first determine the synchronization information of the first cell according to the synchronization information of the second cell, for example, determine the subframe boundary of the second cell according to the subframe boundary of the first cell. After determining the subframe boundary of the first cell, the UE may detect the first signal by using a symbol length of the first signal in time in a neighborhood of a symbol position understood by the UE. Herein the neighborhood of the symbol position may indicate that the UE detects a symbol boundary of the first cell by detecting the first signal by using a sliding window method. The UE may perform related detection by using different possible sequence forms of the first sequence and the received signal, or use another detection method. For the detected first sequence, the UE may determine the reference time point according to the correspondence between the detected first sequence and the reference time point. For example, if content sent by the first OFDM symbol of the first signal is the first sequence, the determined reference time point may be an OFDM symbol position in which the first sequence is sent; or if content sent by the second OFDM symbol of the first signal is the first sequence, the determined reference time point may be an OFDM symbol position in which the first sequence is sent, or may be the start sending position of the first signal. The correspondence between the reference time point and the sequence and whether the reference time point corresponds to the start sending position of the first signal or another data sending position may be predefined or specified in a standard, or may be notified to the UE by using signaling by any cell included in a base station in which the first cell is located. If the symbol boundaries of the first cell and the second cell are also synchronized on the UE side, the UE may further determine an understanding about the symbol boundary of the first cell by directly using an understanding about the symbol boundary of the second cell, so as to detect the first signal at intervals of one symbol or at intervals of multiple symbols. Further, the UE may further buffer data with a length in the first cell, and then perform detection.

In this embodiment of the present invention, the UE may not only determine the synchronization information of the first cell according to the synchronization information of the second cell, but also determine the synchronization information of the first cell according to historical synchronization information of the first cell, that is, for the first cell that works on the unlicensed spectrum, using an unlicensed spectrum resource is opportunistic. If the first cell served the UE when obtaining an unlicensed spectrum resource last time, the UE may determine current synchronization information of the first cell according to previous synchronization information of the first cell that served the UE.

More generally, in the present invention, the one-to-one correspondence between the sequence information of the first sequence and the reference time point may be: the sequence information of the first sequence is directly used to indicate the reference time point, or a particular relationship exists between a time position indicated by the sequence information of the first sequence and the reference time point, for example, at intervals of several OFDM symbols or at intervals of several fractional OFDM symbols. Therefore, the reference time point may be determined by using the time position indicated by the first sequence and the relationship between the time position indicated by the sequence information of the first sequence and the reference time point. It should be noted that, in this embodiment of the present invention, sequence information of one first sequence may indicate multiple different reference time points, or may indicate one reference time point; on the other hand, sequence information of multiple different first sequences may indicate one reference time point, or may indicate multiple different reference time points.

One understanding about the one-to-one correspondence between the sequence information of the first sequence and the reference time is that, the sequence information of the first sequence indicates a time position of a signal carrying the first sequence, where the signal carrying the first sequence is a part of the first signal. If the reference time point is defined as a start time position of the first signal, the one-to-one correspondence between the sequence information of the first sequence and the reference time point may be understood as follows: the time position of the signal carrying the first sequence is first determined according to the sequence information of the first sequence, and then the start time position of the first signal is determined according to the position of the signal carrying the first sequence in the first signal, that is, the reference time point is determined. Specifically, for example, the first signal occupies two OFDM symbols in time, and the time position of the signal carrying the first sequence in the first signal is two OFDM symbols. Assuming that it is determined, according to the sequence information of the first sequence, that the signal carrying the first sequence is located in a $C^{th}$ OFDM symbol, it may be learned that the start position of the first signal is located in a $(C-1)^{th}$ OFDM symbol. Alternatively, if the time position of the signal carrying the first sequence in the first signal is the start time position of the first signal, that is, if the time position of the signal carrying the first sequence in the first signal is the first OFDM symbol, the start time position of the first signal may be determined directly according to the sequence information of the first sequence. For symbol positions and symbol indexes in a subframe, reference may be made to Table 1.

Another understanding about the one-to-one correspondence between the sequence information of the first sequence and the reference time point is that, if the reference time point is the start time position of the first signal, no matter where the position of signal carrying the first sequence in the first signal is, the sequence form of the first sequence is used to indicate the start time position of the first signal, that is, the reference time point is directly indicated.

In this embodiment of the present invention, in addition to the assumption that the reference time point is the start time position (the start position may be indicated by an OFDM symbol index) of the first signal in the foregoing description of the embodiment, the reference time point may also be another time position of the first signal, for example, an end time position of the first signal, or one or more positions of the first signal from the start time position to the end time position. For example, assuming that the first signal occupies W OFDM symbols in time, and that positions of the W OFDM symbols in a subframe may be indicated by OFDM symbol indexes, for example, #w, #(w+1), ..., #(w+W−1), the reference time point may be indicated by any one or more values in an OFDM symbol index set {#w, #(w+1), ..., #(w+W−1)}. In addition to being indicated by a symbol index, the time position of the first signal may have other forms, for example, using a fractional OFDM symbol as a unit, such as using a 1/Z OFDM symbol as a unit, where Z is preferentially a positive integer. Correspondingly, the reference time point may also be indicated by an OFDM symbol position or index using a fractional symbol as a unit, for example, a first $(1/Z)^{th}$ OFDM symbol or a second $(1/Z)^{th}$ OFDM symbol. Alternatively, the time position of the first signal may be indicated by using a time that can be identified by a cell and/or user equipment UE in the LTE system as a unit, for example, a reciprocal Ts of a sampling rate. In this case, the time position of the first signal may be indicated by an integer quantity of Ts. Further, the reference time point may also be any one or more time points in the first subframe of the first cell, and may be indicated by an absolute time, or may be indicated by a relative time in the first subframe, for example, an OFDM symbol or a timeslot; or may be indicated by a relative time in a long time (one or an integer quantity of radio frames, or one radio super frame), for example, located in an OFDM symbol, a timeslot, or a subframe in the long time range. In this case, as described above, as long as the one-to-one correspondence between the sequence information of the first sequence and the reference time point is known, no matter whether the time point indicated by the sequence information of the first sequence is the reference time point or a specific time relationship exists between the time point indicated by the sequence information of the first sequence and the reference time point, the reference time point may be determined according to the detected sequence information of the first sequence. The sequence information of the first sequence may include one or more of a time resource, a frequency resource, or a code resource carrying the first sequence. Different forms and/or different combinations of one or more of a time resource, a frequency resource, or a code resource of the first sequence may correspond to reference time points on a one-to-one basis. The time resource of the first sequence may include an OFDM symbol, a timeslot, a subframe, a radio frame, or the like that carries the first sequence. On the other hand, if the signal carrying the first sequence occupies one OFDM symbol in time, when the time resource of the first sequence is a timeslot, a subframe, or a radio frame, the time resource of the first sequence may further be the timeslot, the subframe, or the radio frame including the signal carrying the first sequence; further, the time resource carrying the first sequence may also be a fractional OFDM symbol. The frequency resource of the first sequence may include a frequency resource occupied by the signal carrying the first sequence, for example, may be indicated by a subcarrier, a resource element (Resource Element, RE), a resource block (Resource Block, RB), a physical resource block (Physical Resource Block, PRB), or a virtual resource block (Virtual Resource Block, VRB). The code resource of the first sequence may include sequences used for forming the first sequence. For example, if the sequences used for forming the first sequence are sequences forming the PSS in the current LTE system, the code resource of the first sequence includes one or more of three Zadeoff-Chu (ZC) sequences. In this case, one sequence (ZC1) in the Zadeoff-Chu sequences may be used to correspond to one reference time point, and another sequence (ZC2) in the Zadeoff-Chu sequences is used to correspond to another reference time point, and so on. For another example, if the sequences used for forming the first sequence are sequences forming the SSS in the current LTE system, the code resource of the first sequence is one or more of sequences, namely, m sequences, forming the SSS. More generally, the code resource of the first sequence may be sequences used in the current LTE system, for example, ZC sequences, binary sequences, or m sequences.

In the foregoing process, both the base station and the UE may know the one-to-one correspondence between the sequence information of the first sequence and the reference time point, for example, the correspondence between the sequence information of the first sequence and the reference time point, the time position of the signal carrying the first sequence in the first signal, or the relationship between the time position indicated by the reference time point and the time position indicated by the sequence information of the detected first sequence. For the UE, the one-to-one correspondence between the sequence information of the first sequence and the reference time point may be known by the UE in a manner such as predefinition, standard specification, signaling notification, or factory setting. For the base station, the correspondence may be learned by the base station in a manner such as predefinition, standard specification, signaling interaction, or factory setting.

Incidentally, in this embodiment of the present invention, unless otherwise specified, all content that needs to be learned by the base station or the UE may be learned in a manner such as predefinition, standard specification, signaling interaction, or factory setting, that is, the manner of learning content by the base station or the UE is not limited in this embodiment of the present invention.

Optionally, in another embodiment of the present invention, when the reference time point is determined according to the detected first sequence in step 202, the reference time point may be determined according to an index of a symbol that is in the first cell and closest to a position of the first sequence.

In this embodiment of the present invention, symbol indexes may correspond to relative positions of symbols in a subframe on a one-to-one basis, as shown in Table 1.

Using a case in which the first signal and the data signal are a downlink signal and channel as an example, on the base station side, the first cell may obtain the synchronization information of the first cell in a manner such as a GPS or a wired network synchronization protocol, or obtain the synchronization information of the first cell by listening to a synchronization reference signal of another cell in a manner of air-interface synchronization, and further determine a subframe boundary, a timeslot boundary, a symbol boundary, a frame boundary, a super frame boundary of the first cell, or the like. Afterward, the first cell sends, according to a time point at which the first cell seizes an opportunity to use an unlicensed spectrum resource, the first signal starting from a position of an index of a symbol that is after the time point and closest to the time point, or starting from a position of an index of a symbol that is after the time point and has a specific distance from the time point, where the first signal carries the first sequence, and the specific distance may be learned by the cell and/or the UE in a manner of predefinition, standard specification, or signaling interaction. Herein, if the time point at which the first cell seizes the opportunity to use the unlicensed spectrum resource is not an end boundary at which the first cell may send data, for example, a symbol boundary, the first cell may send a padding starting from seizing the opportunity to use the unlicensed spectrum resource and before the first signal starts to be sent.

According to the synchronization information of the first cell, the UE obtains time information of the first cell, for example, a radio frame index, a subframe index, a timeslot index, and a symbol index of the first cell. The UE may obtain the foregoing information by tracing a synchronization signal of the first cell. For example, the UE may obtain the synchronization information of the first cell by reading a synchronization reference signal sent by the first cell, for example, a PSS, an SSS, a CRS, a UE-specific reference signal (UE-specific Reference Signal) used for PDSCH data demodulation, a demodulation reference signal DM-RS used for EPDCCH demodulation, a PRS, a CSI-RS, a DRS, or a multicast broadcast single frequency network reference signal (Multicast Broadcast Single Frequency Network Reference Signal, MBSFN RS). Alternatively, considering that data sending is opportunistic if the first cell works on the unlicensed spectrum, when the UE determines the reference time point according to the synchronization information of the first cell, synchronization information of the first cell that is stored historically may be further used as synchronization information of the first cell for determining the reference time point. The UE may determine an OFDM symbol position in the first cell by using the synchronization information of the first cell that is stored historically. For example, the UE may have the synchronization information of the first cell that is stored historically, but there is a difference between the synchronization information and actual synchronization information of the first cell. In this case, the UE may further determine the time synchronization information of the first cell by using the detected first sequence, for example, an OFDM symbol boundary or an OFDM symbol position. In this way, a time position of the reference time point may be determined accurately (for example, indicated by an OFDM symbol index or an OFDM symbol position). The UE may detect the first signal according to the obtained time information of the first cell. For example, detection is performed by using an OFDM symbol as a unit. Once the first sequence is detected, because the UE has obtained the time information of the first cell, the time position of the signal carrying the first sequence may be directly learned, and the position or a variation of the position is used as the reference time point. Herein the "variation" means that if the reference time point refers to the start sending position of the first signal, but the first sequence is not content included in the signal sent by the first OFDM symbol, after the time position of the detected first sequence is determined, the reference time point needs to be determined according to the symbol position of the signal carrying the first sequence in the first signal.

As described above, assuming that the reference time point is indicated by an OFDM symbol position in the first subframe, and that the time position corresponding to the reference time point is a time position close to the signal carrying the first sequence, for example, the time position of the signal carrying the first sequence in the first subframe is a $D^{th}$ OFDM symbol in the first subframe or is indicated by an OFDM symbol whose symbol index is #(D−1) in the first subframe, the index of the symbol closest to the position of the first sequence may be a $(D−1)^{th}$ OFDM symbol, or may be the $D^{th}$ OFDM symbol, or may be a $(D+1)^{th}$ OFDM symbol. More generally, the reference time point may be determined according to an index of a symbol that is in the first cell and has a specific time relationship with the position of the first sequence, in addition to the index of the symbol that is in the first cell and closest to the position of the first sequence, where the specific time relationship may be indicated by an integer quantity of OFDM symbol indexes, and may be predefined or may be learned by the UE in a signaling manner. For example, the first signal includes multiple OFDM symbols. The reference time point is the start time position of the first signal, and may be indicated by a time position of the first OFDM symbol carrying the first signal, and the signal carrying the first sequence is the second OFDM symbol in the first signal. In this case, the determining a reference time point according to the detected first sequence includes: determining the reference time point according to the detected first sequence and a relationship between the time position of the signal carrying the first sequence and the time position reflected by the reference time point. In this example, the index of the symbol that is in the first cell and before the position of the detected first sequence and closest to the position of the first sequence is used as the reference time point. It should be noted that, in this embodiment of the present invention, an OFDM symbol position or an OFDM symbol index is used as an example to indicate the reference time point, the time position of the first sequence of the detected first signal, and the time position of the first signal (including the start time position, the end time position, and one or more positions from the start time position to the end time position of the first signal in time). However, the technology in this embodiment of the present invention is further applicable to indicating the reference time point, the time position of the first sequence of the detected first signal, the time position of the first signal, and the like by using other time information, for example, a position of a fractional OFDM symbol or an index of a factional OFDM symbol, or by using a signal sampling rate and/or a reciprocal of a signal sampling rate. These implementation manners all fall within the scope of this embodiment of the present invention.

In summary, as an extension to this embodiment, the determining a reference time point according to the detected first sequence may further include: determining the reference time point according to an index of a symbol that is in the first cell and closest to a position of the first sequence, and a relative position of the signal carrying the first sequence in the first signal. For example, the reference time point is defined as any position from the start time position to the end time position of the first signal. In this case, the index of the symbol that is in the first cell and closest to the position of the first sequence may be considered as the time position of the signal carrying the first sequence, and then any position from the start time position to the end time position of the first signal, indicated by an OFDM symbol index, may be determined with reference to the time position of the signal carrying the first sequence and the relative position of the signal carrying the first sequence in the first signal, and the reference time point is further determined. In a further extended embodiment, the determining a reference time point according to the detected first sequence may further include: determining the reference time point according to an index of a symbol that is in the first cell and closest to a position of the first sequence, and a relative relationship between the signal carrying the first sequence and the reference time point. For example, the reference time point is defined as an $E^{th}$ OFDM symbol in the first subframe. According to a fact that the index of the symbol that is in the first cell and closest to the position of the first sequence is an $F^{th}$ OFDM symbol in the first subframe, a time position of the $E^{th}$ OFDM symbol in the first subframe may be determined according to a time position of the detected $F^{th}$ OFDM symbol (which may be indicated by a symbol position) and a relative relationship between E and F (for example, how many OFDM symbols exist between the two positions), and then further the time position of the reference time point is determined, or the reference time point is determined.

Optionally, in another embodiment, when the reference time point is determined according to the detected first sequence in step 202, the reference time point may be determined according to an index of a symbol that is in the second cell and closest to a position of the first sequence, where the second cell and the first cell are deployed on different spectrum resources.

For example, as shown in the embodiments in FIG. 3a and FIG. 3b, the second cell serving as the reference time source and the first cell are deployed on different spectrum resources. For example, the first cell may work on an unlicensed spectrum, and the second cell may work on a licensed spectrum.

This embodiment is similar to the foregoing embodiment of determining a reference time point according to time synchronization information of the first cell. A difference is that "according to the time synchronization information of the first cell" in the foregoing embodiment is replaced with "according to the time synchronization information of the second cell".

For example, the index of the symbol that is in the second cell and closest to the position of the detected first sequence may be determined as the reference time point. Herein the second cell may also be replaced with another reference time source. In this embodiment of the present invention, the reference time source is not limited only to a cell using a licensed spectrum to perform data transmission, and may also be in another form, for example, a GPS or a wired network clock synchronization protocol, for example, the IEEE 1588 protocol, or a synchronization source base station in RIBS. Such a replacement still falls within the scope of this embodiment of the present invention.

Herein it should be noted that, if there is an offset between an understanding by the first cell and an understanding by the second cell about time synchronization, for example, there is a fixed time offset between the first cell and the second cell, the determining a reference time point according to the detected first sequence further includes: determining the reference time point according to an index of a symbol that is in the second cell and closest to a position of the first sequence and the time offset between the first cell and the second cell. The time offset between the first cell and the second cell may be indicated by an integer quantity of OFDM symbols, or may be indicated by an integer quantity of timeslots, or may be indicated by other time units, for example, the reciprocal Ts of the sampling rate in the LTE system mentioned in the foregoing embodiment. The UE may obtain the time offset between the first cell and the second cell by itself through detection. For example, the UE may determine the time offset between the first cell and the second cell by using the obtained time synchronization information of the first cell and time synchronization information of the second cell. The time offset between the first cell and the second cell may also be learned by the UE in a signaling notification manner. For example, the first cell and the second cell listen to synchronization signals of each other because they are co-sited or by using a backhaul link (backhaul), for example, an X2 or S1 interface, or through a mobility management entity (Mobility Management Entity, MME), or through air-interface signaling interaction, or through an air interface, and may learn the time synchronization information each other, and therefore learn a time offset between time synchronization information of the peer and its own time synchronization information. Therefore, the first cell and/or the second cell may notify the time offset to the UE.

On the base station side, the first cell determines the synchronization information of the first cell according to the synchronization information of the second cell. The first cell determines the subframe boundary, symbol boundary, timeslot boundary, frame boundary, super frame boundary, and the like of the first cell according to the synchronization information of the second cell. Time boundary alignment, for example, subframe alignment, timeslot alignment, symbol alignment, frame alignment, or super frame alignment may be performed between the first cell and the second cell, or there may be a fixed time offset between the time boundary of the first cell and the time boundary of the second cell. Afterward, the first cell sends, according to a time point at which the first cell seizes an opportunity to use an unlicensed spectrum resource, the first signal starting from a position of an index of a symbol that is after the time point and closest to the time point or starting from a position of an index of a symbol that is after the time point and has a specific distance from the time point, where the first signal carries the first sequence, and the specific distance may be learned by the cell and/or the UE in a manner of predefinition, standard specification, or signaling interaction.

The UE side may learn, according to the time information of the second cell and with or without reference to the time offset understood in time between the first cell and the second cell, the time position of the signal carrying the first sequence in the first cell, and determine the position or a variation of the position as the reference time point. For example, the UE may use an index of a symbol that is in the second cell and before the position of the detected first sequence and closest to the detected position as the reference time point; or the UE may use an index of a symbol that is in the second cell and after the position of the detected first sequence and closest to the detected position as the reference time point; or the UE may determine the time information of the first cell according to the time information of the second cell and the time offset understood in time between the first cell and the second cell, and then use, according to the time information of the first cell, an index of a symbol that is closest to the position of the detected first sequence or an index of a symbol having a specific distance relationship as the reference time point.

Optionally, in another embodiment, the position of the foregoing first sequence includes a start time position of the first sequence. Assuming that the signal carrying the first sequence occupies one OFDM symbol in time for performing transmission, the start time position of the first sequence, namely, an OFDM symbol position occupied by the signal carrying the first sequence, may be indicated by a symbol index of the OFDM symbol. If the signal carrying the first sequence occupies multiple OFDM symbols in time, for example, the first signal occupies multiple OFDM symbols, in this embodiment of the present invention, the start time position of the first sequence may be the start position of the first signal, or more generally, the position of the first sequence may further be any one or more positions from the start time position to the end time position of the first signal. However, a specific form of the position of the first sequence is not limited in this embodiment of the present invention. For example, the position of the first sequence may also be an end time position of the first sequence. Assuming that a time length of the first sequence is known or preset, the start time position of the first sequence and the end time position of the first sequence may be mutually deduced. In different implementation manners of determining the reference time point according to the detected first sequence, not only the reference time point can be determined, but also a problem of ambiguously determining the start position of the first sequence by the UE is resolved. Especially when the UE determines the reference time point of the first cell by using the time information of the second cell, the following problem exists: Because a signal sent by the first cell and a signal sent by the second cell arrive in different time positions on the UE side, the UE determines the reference time point of the first cell incorrectly. Specifically, assuming that the first cell is a cell deployed on the unlicensed spectrum, and that the second cell is a cell deployed on the licensed spectrum, a synchronization requirement defined for CA (inter-band CA) between different frequency bands according to a current LTE protocol specification is that a synchronization error between cells aggregated in the CA manner is not greater than 260 nanoseconds. However, considering problems such as propagation delays from different cells to the UE side, on the UE side, when signals simultaneously sent by cells aggregated in the CA manner arrive at the UE side, an allowed synchronization error is not greater than 30.26 microseconds. 30.26 microseconds is approximately equal to a length of a half OFDM symbol. Therefore, on the UE side, if the OFDM symbol boundary of the first cell is determined based on the OFDM symbol boundary of the second cell, determining confusion may exist. For example, the start sending position of the first signal in the first cell is a $k^{th}$ OFDM symbol, and symbol boundaries of the $k^{th}$ OFDM symbol of the first cell and a $k^{th}$ OFDM symbol of the second cell are aligned. When signals of the first cell and the second cell arrive at the UE side, the symbol boundary of the first cell and the symbol boundary of the second cell that are received by the UE are not aligned, and there is a difference of 30.26 microseconds. In this case, when the UE determines the start sending position of the first signal in the first cell according to the symbol boundary of the second cell, the UE cannot determine whether the start sending position of the received first signal sent by the first cell is the $k^{th}$ OFDM symbol, a $(k-1)^{th}$ OFDM symbol, or a $(k+1)^{th}$ OFDM symbol. In the manner of the foregoing embodiment, the UE may clearly learn an OFDM index number of the first cell, and accurately determine a position of the first signal, for example, the start time position of the first signal.

Optionally, in another embodiment, when the position of the data channel is determined according to the determined reference time point in step 203, if a time length between the determined reference time point and an end boundary of the first subframe is not less than X1, it may be determined that the position of the data channel is located in the first subframe. X1 is a time length that is not less than 0.

The end boundary of the subframe may be understood as an end time point of a last symbol of the subframe, or may be understood as a start time point of a subframe next to the subframe, or may be understood as a boundary time point between the subframe and a subframe next to the subframe.

Herein X1 may be preset. For example, X1 may be predefined, or configured by a network, or learned by a base station or UE in a signaling manner, for example, learned by the base station through a backhaul link (an X2 interface or an S1 interface), or learned by the UE by using signaling (physical signaling, higher layer signaling, or MAC signaling). In an embodiment, X1 may indicate a quantity of OFDM symbols (or a quantity of fractional OFDM symbols) occupied by control information that can support data transmission between the first cell and the UE and is required for supporting the data transmission, in the first subframe. Herein the data transmission between the first cell and the UE includes control data transmission and/or service data transmission. The control data includes, for example, control data carried on at least one of the following control channels in the LTE system: data carried on a PDCCH, an EPDCCH, a PCFICH, a PHICH, or a PBCH. The service data includes, for example, service data carried on at least one of the following data channels: data carried on a PDSCH or a PMCH. The control information required for supporting the data transmission may include at least one of the following: the spectrum identifier of the unlicensed spectrum, the cell identity of the first cell, the public land mobile network (Public Lands Mobile Network, PLMN) identifier of the first cell, the synchronization information of the first cell, or information indicating that the first cell performs data transmission by using the unlicensed spectrum (for example, whether the first cell performs data transmission by using the unlicensed spectrum may be determined by detecting whether the information exists), where the synchronization information of the first cell may be implemented by using a reference signal sent by the first cell, and may include a PSS, an SSS, a CRS, a DMRS, a CSI-RS, a PRS, a UE-specific reference signal, or a DRS. The following uses a quantity of OFDM symbols as an example for description.

Assuming that the determined reference time point is a symbol index corresponding to the start position of the first signal, X1 may be indicated by Xa+Xb, where Xa may indicate a minimum value of a quantity of OFDM symbols that may be supported in a subframe by the LTE system and are used for data transmission, Xb may indicate a minimum value of a quantity of OFDM symbols that carry necessary control information to support data transmission in the subframe of the LTE system, for example, Xb=4. In the four OFDM symbols, a signal carried by the first OFDM symbol may be used to determine whether the first cell uses the unlicensed spectrum to perform data transmission, and may be obtained in a manner of performing energy detection and/or signal parsing on the signal carried by the first OFDM symbol; any one or more of signals carried by the first OFDM symbol to the fourth OFDM symbol may be used to determine the reference time point; and any one or more of the signals carried by the first OFDM symbol to the fourth OFDM symbol may be used to determine the synchronization information of the first cell, for example, enabling the UE to obtain time synchronization and/or frequency synchronization of the first cell. If the time length between the determined reference time point and the boundary of the first subframe is not less than X1, the following fact is indicated: Starting from successfully seizing an opportunity to use the unlicensed spectrum, and before the end of the first subframe, a quantity of OFDM symbols included in this range in the first subframe may support normal data transmission between the first cell and the UE. Herein the normal data transmission means that the quantity of the OFDM symbols included in the foregoing range in the first subframe may help the UE to obtain necessary information for data demodulation (for example, the foregoing control information required for supporting the data transmission) and perform data transmission (for example, the foregoing control data transmission and/or service data transmission between the first cell and the UE).

Figure 4A:
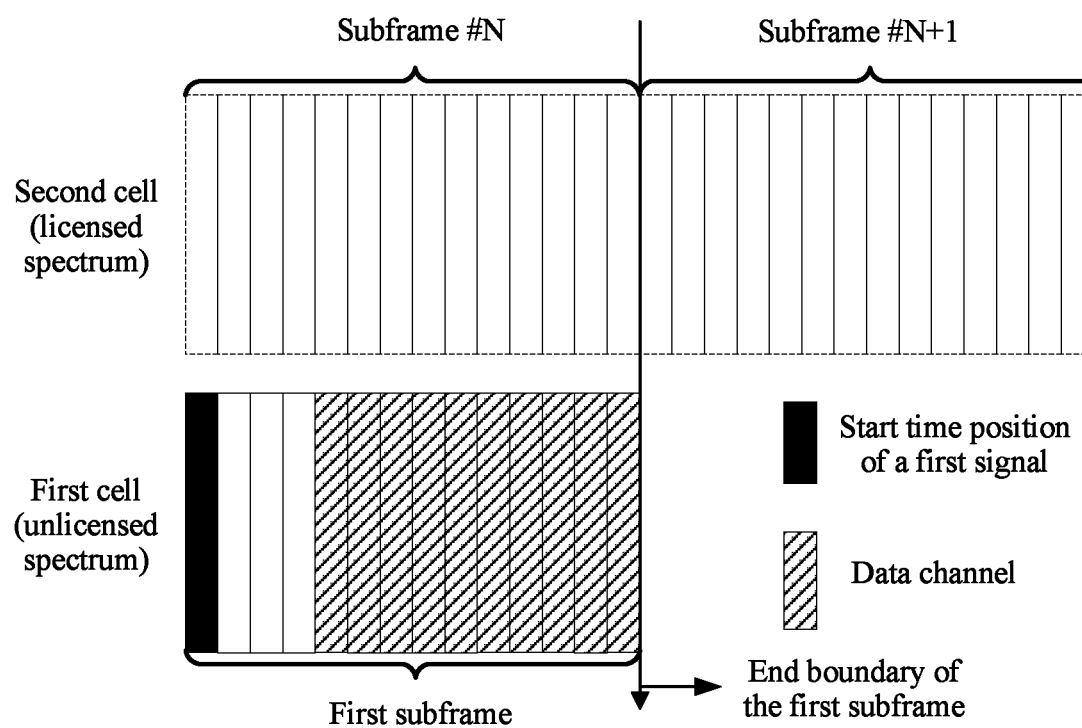
FIG. 4a and FIG. 4b are schematic diagrams of signal positions according to an embodiment of the present invention.
Figure 4B:
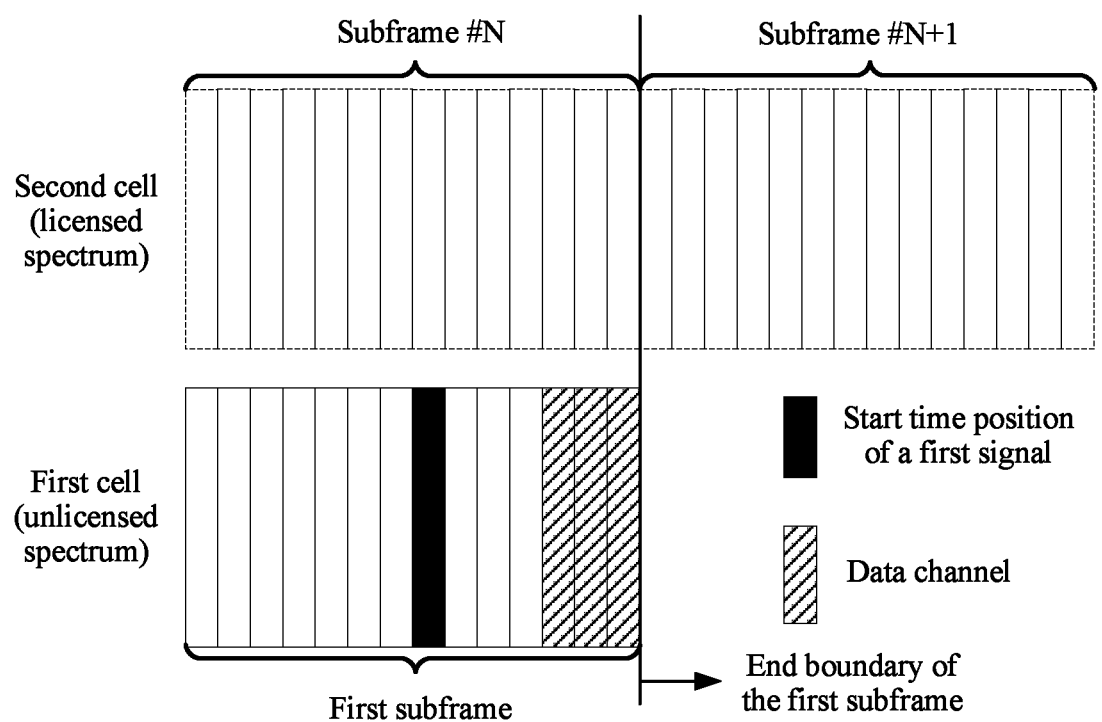

Referring to examples in FIG. 4a and FIG. 4b, a detailed description is provided. FIG. 4a and FIG. 4b are schematic diagrams of signal positions according to an embodiment of the present invention.

In the embodiments in FIG. 4a and FIG. 4b, assuming Xa=3 and Xb=4, the reference time point is a symbol index corresponding to the start position of the first signal. The reference time point is located in the first subframe, that is, in a subframe of the first cell that is aligned with a subframe #N of the second cell shown in FIG. 4a and FIG. 4b. In this case, the start position of the first signal is from 0 (as shown in FIG. 4a) to 7 (as shown in FIG. 4b), and all positions of the data channel may be located in the first subframe.

In this embodiment of the present invention, the first signal may occupy only one OFDM symbol in time, for example, an OFDM symbol filled in black in FIG. 4a and FIG. 4b. The first signal may also occupy multiple OFDM symbols in time, for example, the OFDM symbol filled in black in FIG. 4a and FIG. 4b and one, two, or three OFDM symbols after the OFDM symbol. At least one of the OFDM symbols occupied by the first signal in time carries the first sequence.

It should be noted that, in this embodiment of the present invention, X1 may further include only Xa and exclude Xb, or Xa and Xb have an overlapping part of OFDM symbols, that is, OFDM symbols (a quantity may be indicated by Xb) carrying necessary control information may overlap OFDM symbols carrying data transmission (a quantity may be indicated by Xa), where the necessary control information and the data transmission may be multiplexed in X1 OFDM symbols by time-division multiplexing, frequency division multiplexing, code division multiplexing, space division multiplexing, or the like. More specifically, in this embodiment of the present invention, the OFDM symbol carrying the first signal may overlap an OFDM symbol used for control data transmission and/or service data transmission.

For example, assuming X1=Xa=3, in this case, the first signal overlaps the data channel. Whether the first cell uses the unlicensed spectrum to perform data transmission may be determined by performing energy detection and/or signal parsing on any one or more of the three OFDM symbols. All the three OFDM symbols may be used for PDCCH transmission. On time-frequency resources included in the three OFDM symbols, some specific REs may be used for carrying necessary control information, for example, a reference signal. A rule for mapping the reference signal on a time-frequency resource is similar to a reference signal mapping rule supported by the LTE system. Assuming that a start position of the PDCCH is a time point at which the first cell starts to occupy the unlicensed spectrum, when the reference signal is mapped, the start position of the PDCCH may be mapped to a first OFDM symbol in a subframe, or the start position of the PDCCH may be mapped to a symbol position in the first subframe. For example, it is assumed that the start position of the PDCCH is a tenth OFDM symbol of the first subframe and that the PDCCH occupies three OFDM symbols, that is, the PDCCH occupies the tenth OFDM symbol, an eleventh OFDM symbol, and a twelfth OFDM symbol. In this case, a symbol carrying the necessary control information may overlap the three OFDM symbols. For example, the reference signal may be carried in REs included in any one or more of the three OFDM symbols, and a rule for mapping the reference signal on a time-frequency resource may be mapping according to that of a first OFDM symbol, a second OFDM symbol, or a third OFDM symbol in a subframe in the existing LTE system, or may be mapping according to that of a tenth OFDM symbol, an eleventh OFDM symbol, or a twelfth OFDM symbol in a subframe in the existing LTE system. More generally, the rule for mapping the reference signal in the three OFDM symbols may also be redefined. The mapping rule may be learned by the UE in a manner of predefinition, standard specification, or signaling notification.

When OFDM symbols (a quantity may be indicated by Xb) carrying necessary control information may overlap OFDM symbols carrying data transmission (a quantity may be indicated by Xa), detecting the first signal may be detecting a signal carried on the unlicensed spectrum by using a possible control data and/or service data format, including signal parsing and/or energy detection. For example, a possible format of a PDCCH carrying information, namely, a downlink control information (Downlink Control Information, DCI) format, may be used to detect a signal on the unlicensed spectrum. Herein if the first cell has seized an opportunity to send data on the unlicensed spectrum, the signal carried on the unlicensed spectrum may include: transmitted control data and/or service data. If the first cell has not seized an opportunity to send data on the unlicensed spectrum, the signal carried on the unlicensed spectrum does not include a signal sent by the first cell on the unlicensed spectrum. The first sequence of the detected first signal may include a DCI format matching the detected signal carried by the PDCCH. If the matched DCI format is detected, it may be considered that the first cell has pre-empted the unlicensed spectrum, or if an energy detection result of the DCI format exceeds a particular threshold, it may be considered that the first cell has preempted the unlicensed spectrum. In this case, the determining a reference time point according to a first sequence of the detected first signal may be determining the reference time point according to any one or more OFDM symbol positions of the PDCCH in time. Further, the first signal may be DCI in a specific format, or DCI carried on a specific time-frequency resource. In addition, the first signal may be public DCI in the first cell, or may be UE-specific DCI, or may be DCI specific to a particular group of UEs. Evidently, the UE can detect the first signal only after learning the format of the first signal.

Alternatively, when OFDM symbols (a quantity may be indicated by Xb) carrying necessary control information may overlap OFDM symbols carrying data transmission (a quantity may be indicated by Xa), detecting the first signal may be detecting whether there is a specific signal on a specific time-frequency resource, where the specific signal may include one or more of a PSS, an SSS, a CRS, a DMRS, a CSI-RS, a PRS, a UE-specific reference signal, or a DRS. The channel carrying data transmission may be mapped on any time-frequency resource except the time-frequency resource carrying the specific signal. In this case, detecting the first signal may be detecting whether there is a specific signal by performing related energy detection or by using other detection methods. The first sequence of the detected first signal may be a sequence included in the detected specific signal, for example, sequences forming the PSS, the SSS, the CRS, the DMRS, the CSI-RS, the PRS, the UE-specific reference signal, or the DRS. The reference time point is determined according to the first sequence.

In another embodiment, the first signal may also be a part of the data channel. For example, the first signal is just a control data channel.

In the following embodiment, unless otherwise specified, examples in which the first signal does not overlap the data channel are mainly used for description. However, the examples may also be modified according to the foregoing manner, as an embodiment in which the first signal overlaps the data channel partially or completely, or the first signal is a part of the data channel. Such a modification still falls within the scope of the embodiment of the present invention.

When lengths of the first signal and the second signal are different, for example, the second signal includes the first signal, the time length of the second signal may be further determined.

Optionally, in another embodiment, the receive end may further determine that the time length of the second signal is M1, where the second signal includes the first signal, and M1 is a minimum time length of the second signal.

Specifically, herein M1 may be predefined, or configured by the network, for example, learned by the base station through a backhaul link, or learned by the UE by using signaling (physical layer signaling, higher layer signaling, or MAC signaling).

For example, referring to the embodiments in FIG. 4a and FIG. 4b, M1 may be equal to 4, that is, a preset minimum time length of the second signal may be a quantity of OFDM symbols occupied by control information required for supporting data transmission. In other words, M1 may correspond to the foregoing parameter Xa. In a case in which the start position of the first signal is from 0 to 7, the UE may determine that the time length of the second signal is 4.

If a quantity of OFDM symbols occupied by the first signal in time is less than a quantity of OFDM symbols occupied by the second signal in time, for example, in this embodiment, a quantity of OFDM symbols occupied by the first signal in time is less than 4, the second signal includes the first signal. In this case, when the UE detects the first signal, the UE may detect the first signal according to the format of the first signal, for example, the time length and/or carried content of the first signal. Then the UE may determine the reference time point according to the first sequence of the detected first signal, and further determine the position of the data channel and the length of the second signal. In this embodiment, whether the length of the second signal is equal to M1 may be determined according to the determined reference time point.

If a quantity of OFDM symbols occupied by the first signal in time is equal to a quantity of OFDM symbols occupied by the second signal in time, for example, in this embodiment, a quantity of OFDM symbols occupied by the first signal in time is equal to 4, the first signal is the second signal. Likewise, in this case, when detecting the first signal, the UE may detect the first signal according to the format of the first signal, for example, the length of the first signal. This is equivalent to a fact that the UE has determined the length of the second signal. If the UE has detected the first sequence of the first signal, the UE may determine that the first cell has sent the first signal. Because in this process, the UE has considered the time length of the first signal when detecting the first signal, once the UE determines that the first cell has sent the first signal, the UE may determine the time length of the first signal, which is equal to the time length of the second signal.

In this embodiment of the present invention, if symbol lengths of the first signal and the second signal are different, a detection process of the UE may be simplified, that is, every possible length of the first signal does not need to be detected, and therefore, implementation on the UE side may be simplified.

In this embodiment of the present invention, if the first signal is a part of transmission of the data channel, or when a time unit occupied by the first signal in time overlaps a time unit occupied by transmission of the data channel in time, the time length of the second signal may be a transmission time length of a control data channel and/or a transmission time length of a service data channel.

For a purpose of clear description, the following describes a specific embodiment.

Assumption: The length of the first signal and the length of the second signal are not equal; the length of the first signal is 1, the length of the second signal is 4, and X1=7; the reference time point is the start time position of the first signal, and is indicated by an OFDM symbol index. In another embodiment, the reference time point may also be indicated by a time point at which the first cell successfully seizes an opportunity to use an unlicensed spectrum resource, or more generally, in this embodiment of the present invention, the reference time point may be a time position indicated by any time unit in the first subframe.

The UE may determine the length of the second signal and the position of the data channel by performing the foregoing steps. The information carried by the first signal and the second signal may be learned by the UE in advance, so that the UE detects the first signal and the second signal. A manner of the learning may be a method of predefinition, standard specification, network configuration, or signaling notification. This is not limited in this embodiment of the present invention. The UE may obtain, according to the second signal, some control information used for data channel demodulation. For example, the control information may include at least one of the following: the spectrum identifier of the unlicensed spectrum, the cell identity of the first cell, the synchronization information of the first cell, information indicating that the first cell performs data transmission by using the unlicensed spectrum, or other control information supporting data transmission between the first cell and the UE. Afterward, the UE may receive and detect the data channel according to the start position of the data channel. Specifically, in this example, the data channel may include a control data channel, used to indicate a service data transmission format in the current subframe or indicate a service data transmission format in a non-current subframe. This is not limited herein. In this case, the UE first detects the control data channel, for example, the PDCCH, the EPDCCH, the PCFICH, or the PHICH, and obtains the service data transmission format indicated by the control channel. Alternatively, the data channel may not include the control data channel, but includes only the service data channel. In this case, the service data transmission format corresponding to the service data carried by the service data channel may be predefined or notified in advance on the licensed spectrum. In this way, even if there is no control data channel, the UE may receive and detect the service data channel according to the learned service data transmission format. It should be noted that, when the current LTE system supports data transmission, impact of different quantities of OFDM symbols used for data transmission on data rate matching of the UE is also considered. For example, in a time division duplex TDD (Time Division Duplexing, TDD) system, for a quantity of OFDM symbols included in a downlink pilot timeslot (Downlink Pilot Time Slot, DwPTS), when rate matching is performed, introduction of different coefficients may be considered, for example, 0.75 and 0.375. When the LTE device performs data transmission by using the unlicensed spectrum, due to random use of a resource on the unlicensed spectrum, quantities of OFDM symbols used for data transmission are more diversified. In this case, considering impact on data rate matching of the UE, introduction of a new rate matching table may be considered, or a new rate matching coefficient is introduced, for example, a real number that is greater than 0 and less than 0.375, or a real number between 0.375 and 0.75, or a real number between 0.75 and 1, or another numeric value. This is not limited herein.

Figure 5:
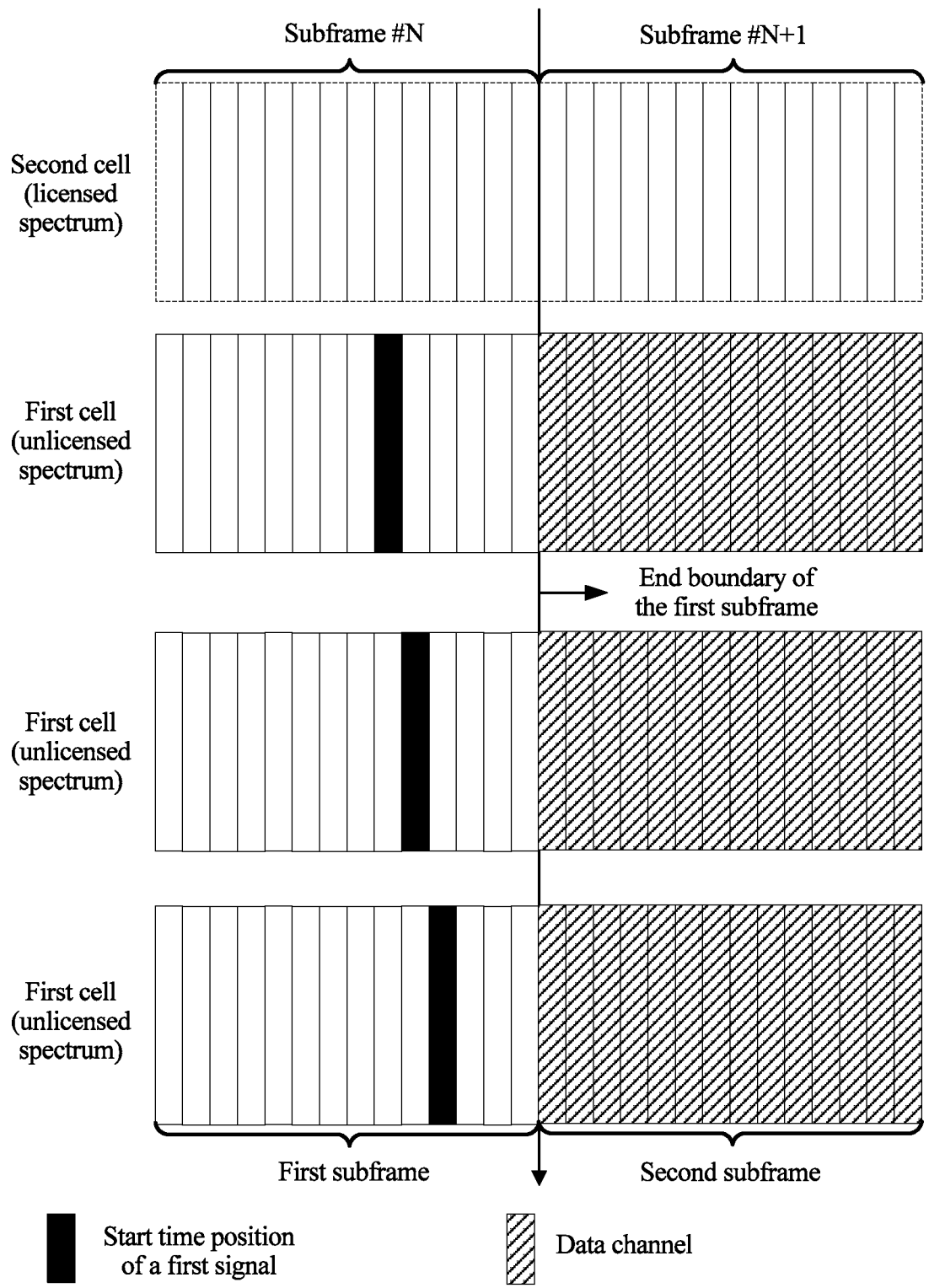
FIG. 5 is a schematic diagram of a signal position according to another embodiment of the present invention.

FIG. 5 is a schematic diagram of a signal position according to another embodiment of the present invention.

Optionally, in another embodiment, as shown in FIG. 5, when the position of the data channel is determined according to the determined reference time point in step 203, if the time length between the determined reference time point and the end boundary of the subframe is less than X2, it is determined that the position of the data channel is located in the second subframe, where the second subframe is a next subframe adjacent to the first subframe. X2 is a time length that is not less than 0.

Specifically, in the embodiment in FIG. 5, the first subframe is a subframe of the first cell that is aligned with the subframe #N of the second cell, and it is assumed that X2 is equal to 7.

If the time length between the determined reference time point and the boundary of the first subframe is less than X2, it indicates that, starting from successfully seizing an opportunity to use the unlicensed spectrum, and before the end of the first subframe, a quantity of OFDM symbols included in this range in the first subframe is not enough to support normal data transmission between the first cell and the UE. Herein the normal data transmission refers to a minimum quantity of OFDM symbols that may help the UE to obtain necessary information for data demodulation and perform data transmission. In addition, the normal data transmission may also be a minimum quantity of OFDM symbols for performing data transmission between the first cell and the UE. Herein the data transmission includes transmission of control data and service data, for example, data carried in one or more channels in the PDCCH, the PCFICH, the PHICH, the EPDCCH, the PDSCH, or the PMCH. In this case, to ensure normal data transmission on the unlicensed spectrum, the data channel may be located in a next subframe adjacent to the first subframe in the first cell.

As shown in FIG. 5, assuming that the reference time point is a symbol index corresponding to the start position of the first signal, when the start position of the first signal is any index from 8 to 10, the position of the data channel is located in a subframe next to the first subframe, that is, the second subframe is a subframe of the first cell that is aligned with a subframe #N+1 of the second cell. Herein the data channel may include a service data channel and a control data channel, or may include only a service data channel, or include only a control data channel. When the data channel includes only a service data channel, a transmission format of the service data channel is predefined or is notified in advance by using the licensed spectrum, that is, content carried on the control data channel supporting demodulation of the service data transmission channel is learned by the UE in a manner of predefinition or advance notification, so that the UE can demodulate the service data channel.

Figure 6:
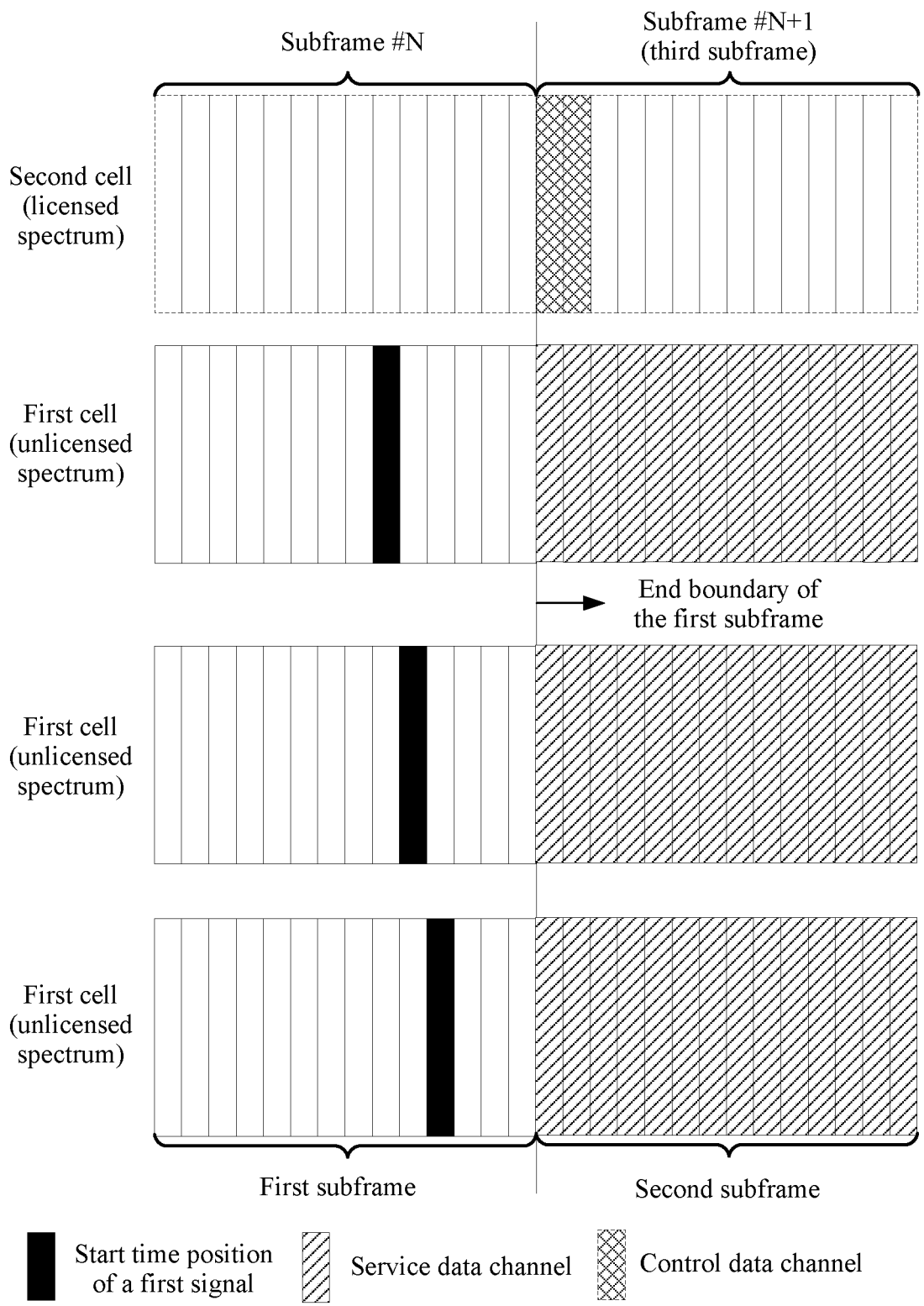
FIG. 6 is a schematic diagram of a signal position according to another embodiment of the present invention.

FIG. 6 is a schematic diagram of a signal position according to another embodiment of the present invention.

Optionally, in another embodiment, as shown in FIG. 6, when the position of the data channel is determined according to the determined reference time point in step 203, if the time length between the determined reference time point and the end boundary of the first subframe is less than X2, it is determined that the position of the data channel is located in a third subframe, where the third subframe is a next subframe that is in the second cell and adjacent to the first subframe in time. Herein the second cell and the first cell are deployed on different spectrum resources. X2 is a time length that is not less than 0.

Specifically, in the embodiment in FIG. 6, the first subframe is a subframe of the first cell that is aligned with the subframe #N of the second cell, and it is assumed that X2 is equal to 7.

If the time length between the determined reference time point and the boundary of the first subframe is less than X2, it indicates that, starting from successfully seizing an opportunity to use the unlicensed spectrum, and before the end of the first subframe, a quantity of OFDM symbols included in this range in the first subframe is not enough to support normal data transmission between the first cell and the UE. Herein the normal data transmission refers to a minimum quantity of OFDM symbols that may help the UE to obtain necessary information for data demodulation and perform data transmission. Herein the data channel may include a service data channel and a control data channel. In addition, the normal data transmission may also be a minimum quantity of OFDM symbols for performing data transmission between the first cell and the UE. Herein the data transmission includes transmission of control data and service data, for example, data carried in one or more channels in the PDCCH, the PCFICH, the PHICH, the EPDCCH, the PDSCH, or the PMCH. In this case, to ensure normal data transmission on the unlicensed spectrum, only the service data channel may be carried in a next subframe that is in the first cell and adjacent to the first subframe, but the control data channel may be carried in a next subframe that is in the second cell and adjacent to the first subframe, for example, in a cross-carrier scheduling manner, so that the control data channel carried in the second cell indicates a transmission format of the service data channel carried in the first cell, and that the UE can demodulate the service data channel.

As shown in FIG. 6, assuming that the reference time point is a symbol index corresponding to the start position of the first signal, when the start position of the first signal is any index from 8 to 10, the position of the service data channel is located in a subframe next to the first subframe, that is, the second subframe is a subframe of the first cell that is aligned with the subframe #N+1 of the second cell, and the third subframe is the subframe #N+1 of the second cell.

Optionally, in another embodiment, if the time length between the determined reference time point and the end boundary of the first subframe is not less than Y1, the receive end may further determine that the time length of the second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i, 1 \leq i < n, L_i < L_{i+1}$, and Y1 is a time length that is not less than 0. More specifically, Y1 may be a time length that is not equal to X2 and not less than 0.

In this embodiment, when the time length between the reference time point and the end boundary of the first subframe is greater than the length of the second signal having a minimum time length, remaining symbols of the first subframe may be used for repeating content of the second signal or used for sending a reservation signal (for example, a padding or a preamble).

Assuming that the determined reference time point is the start time position of the first signal, or is a start time point at which a spectrum resource is successfully preempted on the unlicensed spectrum, Y1 may indicate the preset minimum time length of the second signal. Assuming that Y1 is equal to 4, when a quantity of OFDM symbols between the start position of the first signal and the boundary of the subframe is less than 7 and greater than or equal to 4, because a transmission position of the data channel is located in a next subframe (namely, the foregoing second subframe) that is in the first cell and adjacent to the first subframe and/or a next subframe (namely, the foregoing third subframe) that is in the second cell and adjacent to the first subframe, to prevent another device working on the unlicensed spectrum from preempting the unlicensed spectrum resource, the end time position of the second signal may be located at the end boundary of the first subframe. For example, referring to FIG. 6, the determined length of the second signal may be six OFDM symbols, five OFDM symbols, or four OFDM symbols, where 4, 5, and 6 may correspond to elements in the foregoing length set $\{L_1, L_2, \ldots L_n\}$. A signal that is greater than four OFDM symbols may be formed by repetitions of a second signal having a length of four OFDM symbols, or a reservation signal (padding) may be sent after a second signal having a length of four OFDM symbols until the end boundary of the first subframe is reached.

In an embodiment similar to FIG. 4a and FIG. 4b, for various cases in which a quantity of OFDM symbols occupied by the first signal in time is the same as a quantity of OFDM symbols occupied by the second signal in time, the UE has a corresponding detection process. A slight difference is that, when the length of the first signal is the same as the length of the second signal, because herein the length of the second signal varies according to the reference time point, the UE may detect the first signal by using all possible lengths of the second signal (namely, possible lengths of the first signal), and once the first sequence of the first signal is detected, may determine the length of the second signal.

Optionally, in another embodiment, if the time length between the determined reference time point and the end boundary of the first subframe is less than Y2, it is determined that the time length of the second signal is Z2, where the second signal includes the first signal, Z2 belongs to a length set $\{L_1', L_2', \ldots L_n'\}$, and the end time position of the second signal is located in the second subframe of the first cell. The second subframe is a next subframe adjacent to the first subframe, n is an integer not less than 1, $\forall i, 1 \leq i < n$, $L_i' < L_{i+1}'$, and Y2 is a time length not less than 0. Further, Y2 may be a time length that is not equal to X2 and not less than 0.

In this embodiment, when the time length between the reference time point and the end boundary of the first subframe is less than a normal length of the second signal, a part of the second signal may be extended to a next subframe for continuing sending. The normal length of the second signal generally refers to a minimum time length that meets a control information transmission requirement.

Specifically, assuming that Y2 may indicate the minimum time length of the second signal, if the time length between the determined reference time point and the end boundary of the first subframe is less than Y2, if considered from a perspective of ensuring performance, a symbol length of the second signal may be greater than or equal to Y2, that is, the length of the second signal may belong to the length set $\{L_1', L_2', \ldots L_n'\}$, for example, may be 4, 5, or 6. In this case, the second signal needs to be extended to a next subframe (namely, the foregoing second subframe) that is in the first cell and adjacent to the first subframe. Starting from the end position of the second signal, transmission of the data channel may be performed in the first cell. In addition, in a case of cross-carrier scheduling, the control data channel may start to be transmitted from a start boundary of a next subframe (namely, the foregoing third subframe) that is in the second cell and adjacent to the first subframe, or may start to be transmitted from a particular position included in the third subframe.

In another embodiment, if some OFDM symbols of the second signal overlap some OFDM symbols of the data channel carried by the second subframe, the data channel carried by the second subframe may also start to be transmitted from the start boundary of the second subframe. In this case, information carried by OFDM symbols that are reused for the second signal and the data channel carried by the second subframe may be multiplexed on the resources with the data channel. For example, assuming that the second signal occupies four OFDM symbols in time, where the last two symbols carry a reference signal that may provide synchronization information, such as a CRS, a CSI-RS, a PRS, or DMRS, and also assuming that the data channel that starts to be transmitted from the second subframe is a control data channel such as a PDCCH, information carried by the last two symbols of the second signal may be multiplexed on the resources with the PDCCH, that is, in this case, the PDCCH may start to be transmitted from the start boundary of the second subframe.

Figure 7:
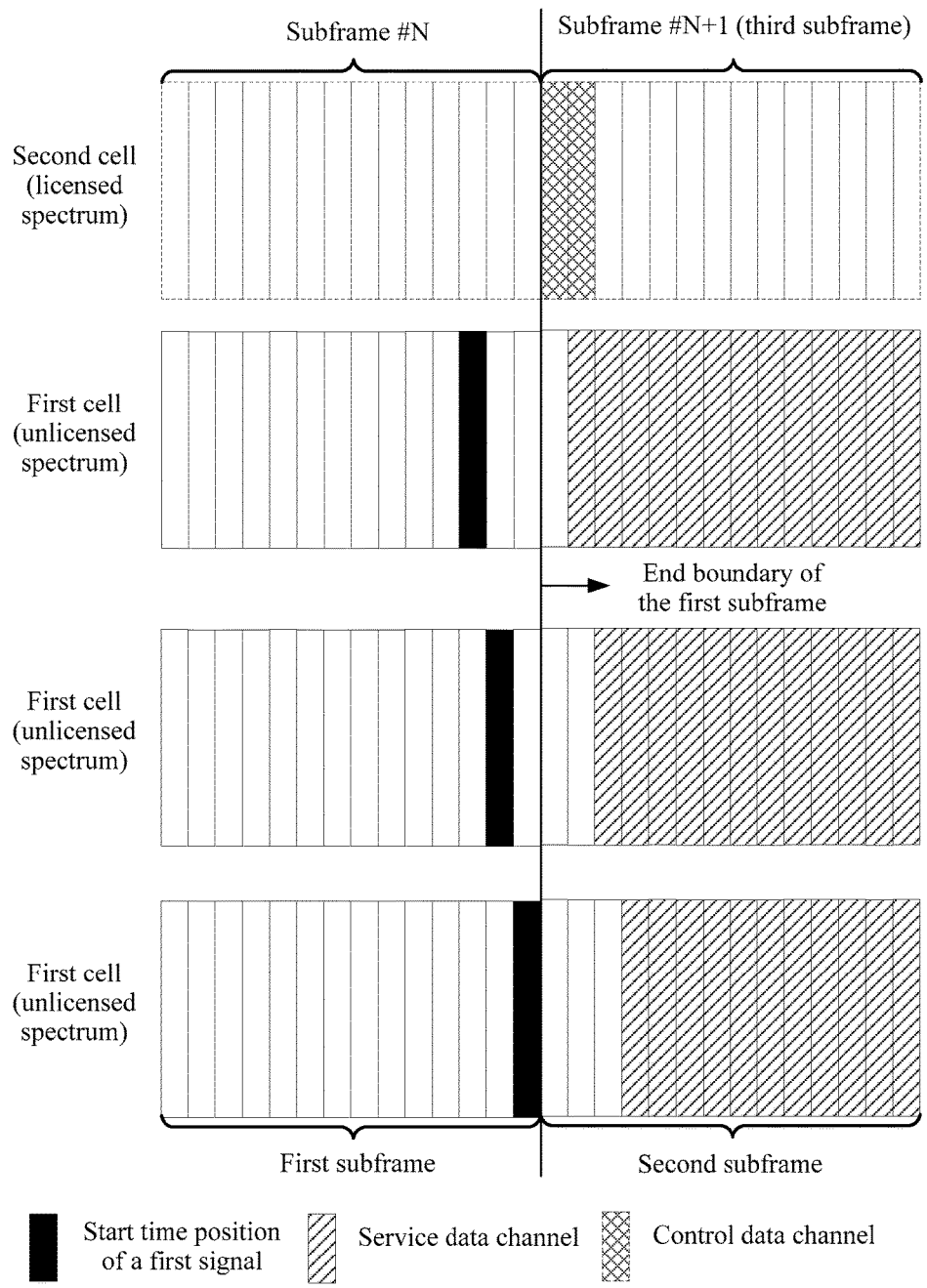
FIG. 7 is a schematic diagram of a signal position according to another embodiment of the present invention.
Figure 8:
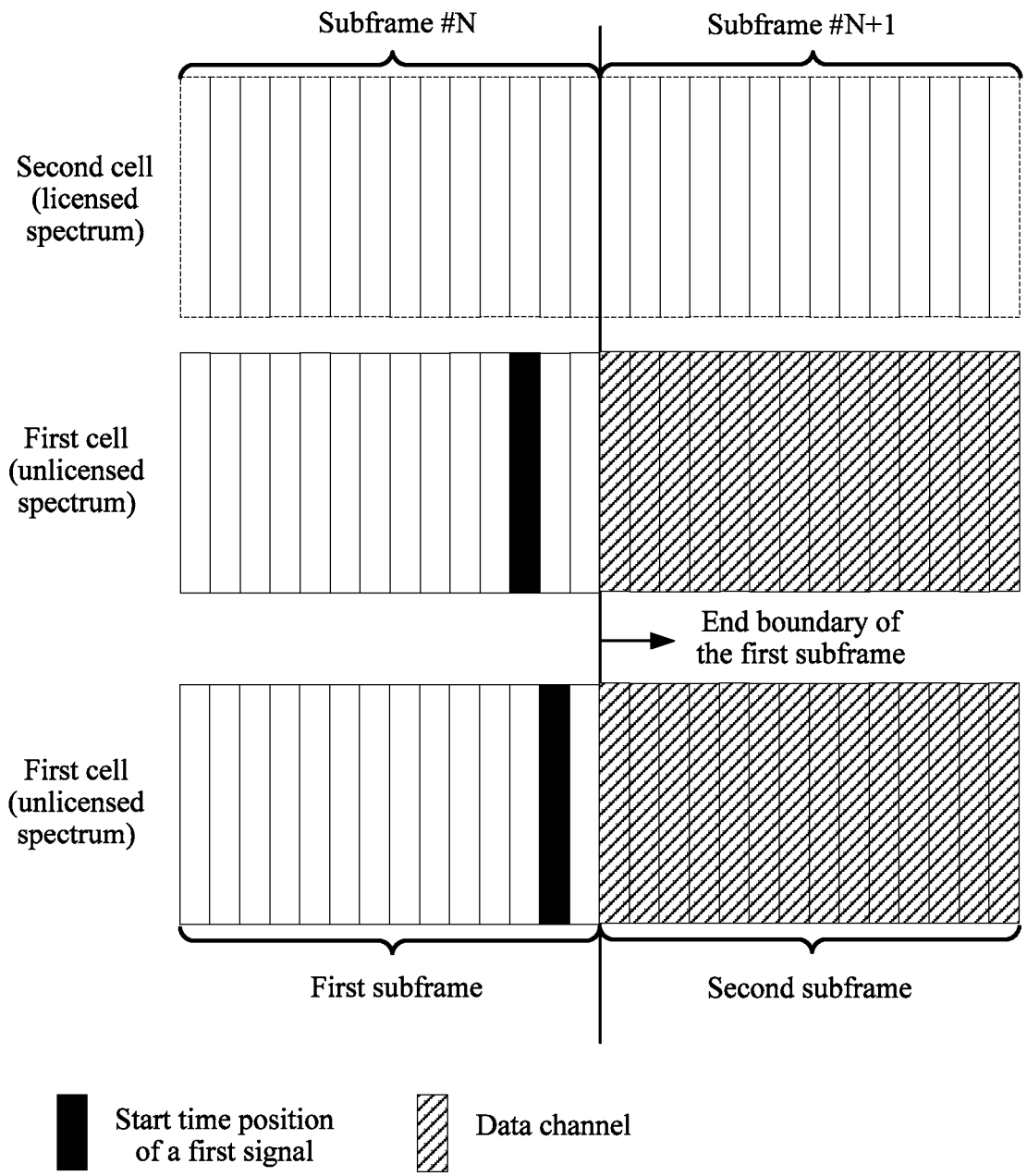
FIG. 8 is a schematic diagram of a signal position according to another embodiment of the present invention.

FIG. 7 provides a schematic diagram of occupancy of the second subframe by the second signal part. Specifically, FIG. 7 is a schematic diagram of a signal position according to another embodiment of the present invention. As shown in FIG. 7, the first subframe is a subframe of the first cell that is aligned with the subframe #N of the second cell, the second subframe is a subframe of the first cell that is aligned with the subframe #N+1 of the second cell, and the third subframe is the subframe #N+1 of the second cell. In FIG. 8, the length of the second signal is four OFDM symbols, that is, four symbols starting from a symbol filled in black in FIG. 7. Data transmission in the second subframe by the first cell starts from the end position of the second signal. If cross-carrier scheduling is used, control data may also start to be transmitted from a start position of the third subframe.

Optionally, in another embodiment, if the time length between the determined reference time point and the end boundary of the first subframe is less than Y3, it is determined that the time length of the second signal is Z3, where the second signal includes the first signal. Z3 is less than M2, and the end time position of the second signal is located at the end boundary of the first subframe. M2 is the minimum time length of the second signal, and Y3 is a time length that is not less than 0. More specifically, Y3 may be a preset time length that is not equal to X2 and not less than 0.

In this embodiment, when the time length between the reference time point and the end boundary of the first subframe is less than the normal length of the second signal, the length of the second signal may be truncated appropriately.

Assuming that M2 is equal to 4, if the determined reference time point is the start time position of the first signal, or is a start time point at which a spectrum resource is successfully preempted on the unlicensed spectrum, Y3 may indicate the minimum time length of the second signal, that is, is equal to the foregoing parameter M2. In this case, because a quantity of OFDM symbols included, starting from successfully preempting the spectrum resource on the unlicensed spectrum to the end boundary of the first subframe, is not enough to support sending of the second signal, an optional method is to reduce the minimum length of the second signal. Generally, meeting a function provided by the second signal needs to be considered in a design of the minimum length of the second signal. For example, if the function of the second signal is to obtain basic synchronization information of the first cell by using the second signal before the first cell and the UE perform data transmission by using the unlicensed spectrum, the minimum length of the second signal is 4. A manner of truncating the second signal may affect data transmission on the unlicensed spectrum between the first cell and the UE to some extent, for example, may reduce precision of tracing synchronization information of the first cell by the UE. However, if the UE saved the synchronization information of the first cell previously, for example, the UE and the first cell previously performed communication by using the unlicensed spectrum, and the UE saved historical synchronization information of the first cell, the truncating solution may be considered in this case, that is, the length of the second signal is reduced.

FIG. 8 provides a schematic diagram of a case in which the second signal is truncated. Specifically, FIG. 8 is a schematic diagram of a signal position according to another embodiment of the present invention. As shown in FIG. 8, the first subframe is a subframe of the first cell that is aligned with the subframe #N of the second cell, the second subframe is a subframe of the first cell that is aligned with the subframe #N+1 of the second cell, and the third subframe is the subframe #N+1 of the second cell. The receive end determines, according to the length between the reference time point and the end boundary of the first subframe, that the length of the second signal is truncated to two or three OFDM symbols.

Optionally, in another embodiment, when the position of the data channel is determined according to the determined reference time point in step 203, if the time length between the determined reference time point and the end boundary of the first subframe is less than X3, and the time length between the determined reference time point and the end boundary of the first subframe is greater than Y4, the receive end may determine that the position of the data channel is located in the first subframe, where X3 and Y4 are time lengths that are not less than 0, and Y4 is not greater than X3.

In this embodiment, when the time length between the reference time point and the end boundary of the first subframe is greater than the length of the second signal, remaining symbols of the first subframe may be used for transmitting the data channel.

Figure 9:
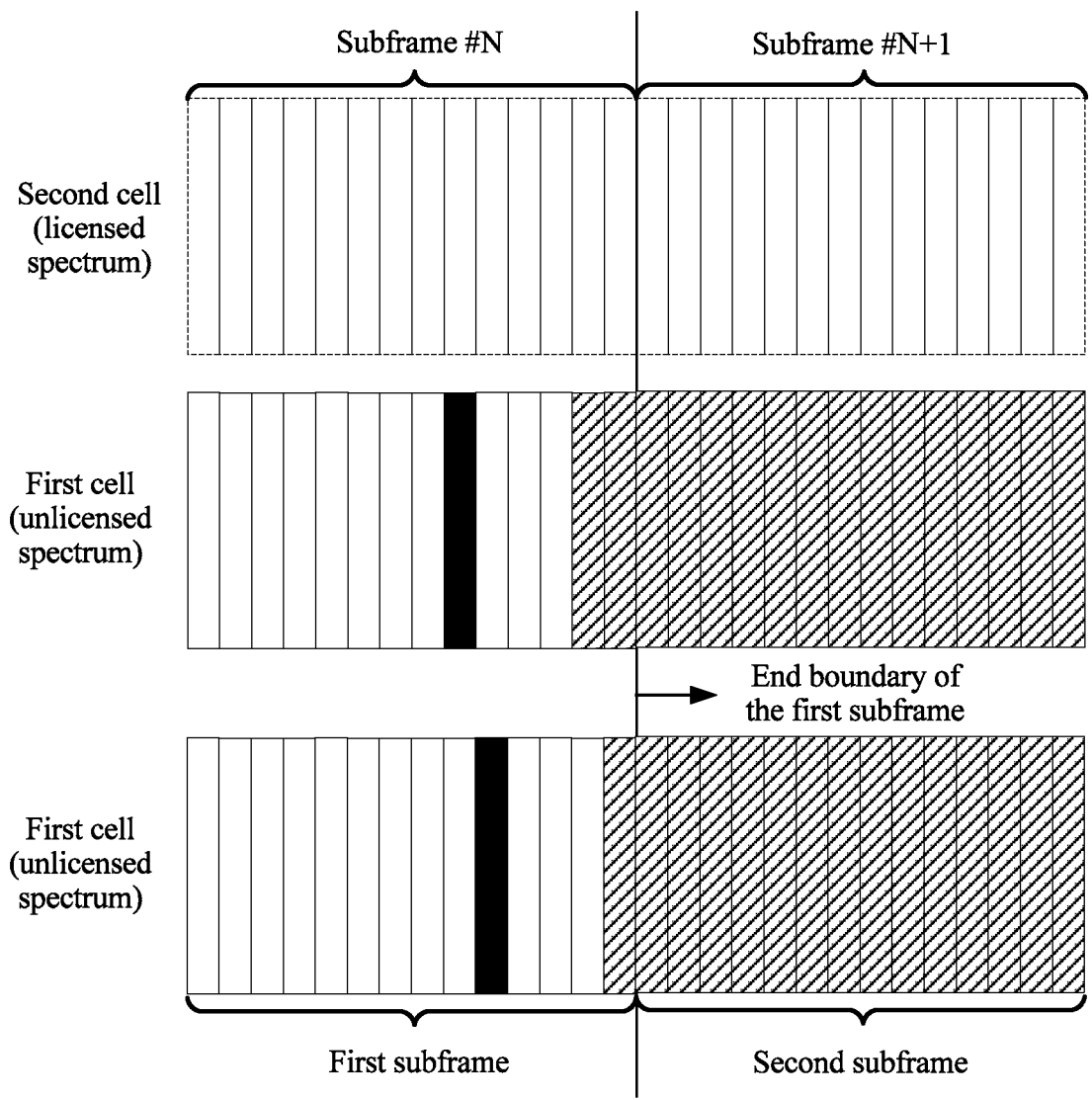
FIG. 9 is a schematic diagram of a signal position according to another embodiment of the present invention.

FIG. 9 is a schematic diagram of a signal position according to another embodiment of the present invention. As shown in FIG. 9, assuming that X3 is equal to 7 and that Y4 is equal to 4, the determined reference time point is the start position of the first signal, the first subframe is a subframe of the first cell that is aligned with the subframe #N of the second cell, and the second subframe is a subframe of the first cell that is aligned with the subframe #N+1 of the second cell. In addition, the reference time point may also be a start position in which data transmission is performed when an opportunity to use a spectrum resource on the unlicensed spectrum is seized. The position of the data channel such as the service data channel may also be located in the first subframe. The control information used for demodulating the information carried by the service data channel may be predefined or indicated in advance by using the licensed spectrum.

Figure 10:
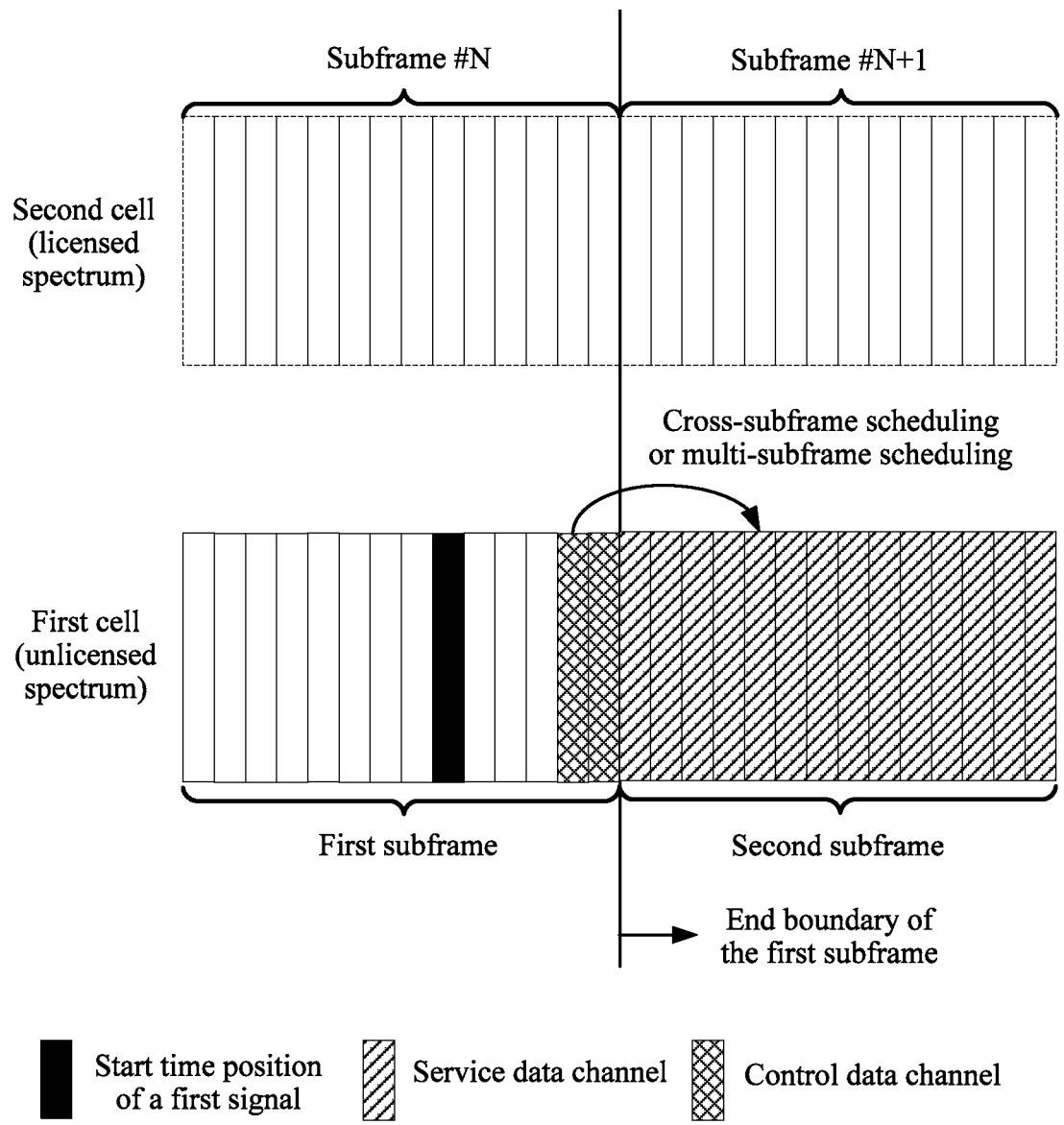
FIG. 10 is a schematic diagram of a signal position according to another embodiment of the present invention.

FIG. 10 is a schematic diagram of a signal position according to another embodiment of the present invention. Each parameter in the embodiment in FIG. 10 is the same as that in FIG. 9, and therefore is not described again.

In the embodiment in FIG. 10, if the time length between the determined reference time point and the end boundary of the first subframe is five or six OFDM symbols, the position of the data channel (for example, a control data channel PDCCH) may be located in the first subframe, and at the same time, the control data channel may carry data scheduling information of the second subframe. Therefore, cross-subframe scheduling or multi-subframe scheduling is implemented.

In FIG. 10, the first subframe is a subframe of the first cell that is aligned with the subframe #N of the second cell, and the second subframe is a subframe of the first cell that is aligned with the subframe #N+1 of the second cell.

For the embodiments in FIG. 9 and FIG. 10, a manner of determining the length of the second channel may be similar to that in each of the foregoing embodiments, and therefore is not described again.

In the foregoing embodiments in FIG. 4 to FIG. 10, a relationship between the determined reference time point and the position of the data channel may be stored at the transmit end and the receive end in a form of a table or the like. This can improve computation efficiency.

Optionally, in another embodiment, a correspondence exists between the reference time point and the position of the data channel, each reference time point corresponds to one index, and each index corresponds to one position of the data channel. A typical manner of expressing the correspondence is a table. The following describes examples of configuration tables of correspondences that may be used in this embodiment of the present invention with reference to specific examples. However, it should be noted that, the examples are only illustrative. A person skilled in the art can easily obtain equivalent tables of the tables or equivalent expression manners, and all the equivalent manners fall within the scope of this embodiment of the present invention.

Assuming that the reference time point is the start sending position of the first signal, or is a start time point at which an opportunity to use the unlicensed spectrum is successfully seized, and that the reference time point is indicated by an OFDM symbol index in a subframe, a form of the foregoing correspondence table is shown in Table 2.

TABLE 2

Configuration example of a correspondence between reference time point and data channel

| Configuration index | Position of a reference time point (OFDM symbol index in a subframe) | Position of a data channel |
|---|---|---|
| 0 | 0 | In the same subframe as the reference time point |
| 1 | 1 | In the same subframe as the reference time point |
| 2 | 2 | In the same subframe as the reference time point |
| 3 | 3 | In the same subframe as the reference time point |
| 4 | 4 | In the same subframe as the reference time point |
| 5 | 5 | In the same subframe as the reference time point |
| 6 | 6 | In the same subframe as the reference time point |
| 7 | 7 | In the same subframe as the reference time point |
| 8 | 8 | Not in the same subframe as the reference time point |

TABLE 2-continued

Configuration example of a correspondence between
reference time point and data channel

| Configuration index | Position of a reference time point (OFDM symbol index in a subframe) | Position of a data channel |
|---|---|---|
| 9 | 9 | Not in the same subframe as the reference time point |
| 10 | 10 | Not in the same subframe as the reference time point |
| 11 | 11 | Not in the same subframe as the reference time point |
| 12 | 12 | Not in the same subframe as the reference time point |
| 13 | 13 | Not in the same subframe as the reference time point |

Table 2 may be further simplified, as shown in the following Table 3.

TABLE 3

Another configuration example of a correspondence between
reference time point and data channel

| Configuration index | Reference time point (OFDM symbol index in a subframe) | Position of a data channel |
|---|---|---|
| 0 | Any value from 0 to 7 | In the same subframe as the reference time point |
| 1 | Any value from 8 to 13 | Not in the same subframe as the reference time point |

Table 3 may be further extended to a more general form, as shown in Table 4.

TABLE 4

Another configuration example of a correspondence between
reference time point and data channel

| Configuration index | Reference time point (OFDM symbol index in a subframe) | Position of a data channel |
|---|---|---|
| 0 | Any value from 0 to K | In the same subframe as the reference time point |
| 1 | Any value from K + 1 to 13 | Not in the same subframe as the reference time point |

K is an integer that is not less than 0 and not greater than 12.

Further, time units in the first subframe may be further grouped into G sets. A universal set of elements included in the G sets is all time units included in the first subframe. For example, if a time unit is indicated by an OFDM symbol, all the time units in the first subframe are symbol indexes of 14 OFDM symbols or positions of the 14 OFDM symbols in the first subframe. The elements included in the G sets may have an intersection set, or may have no intersection set. This is not limited. A case corresponding to time units included in a part of sets in the G sets is: the data channel and the reference time point are in the same subframe. A case corresponding to time units included in another part of sets in the G sets is: the data channel and the reference time point are in different subframes.

In the tables, an example in which the position of the data channel is not in the same subframe as the reference time point may include: the reference time point and the position of the data channel are both located in a same cell, but located in different subframes; or the reference time point and the position of the data channel are located in different cells, but located in subframes having a same subframe index number; or the reference time point and the position of the data channel are located in different cells, and located in subframes having different subframe index numbers.

In this embodiment of the present invention, content in the tables may further include other information. For example, the control data channel included in the data channel is used for at least one of the following: scheduling a service data channel that is located in the same subframe as the control data channel, scheduling a service data channel that is not located in the same subframe as the control data channel (cross-subframe scheduling or multi-subframe scheduling), or scheduling a service data channel that is not located in the same cell as the control data channel (cross-cell scheduling or cross-carrier scheduling). Content in the tables may further include other information, for example, the length of the first signal, and the length of the second signal.

In this embodiment of the present invention, further, content in the tables reflecting the correspondence between the reference time point and the data channel may be further dynamically changed or semi-statically changed, or may be predefined. The network or cell may determine content in the tables according to service load, an interference level of the unlicensed spectrum, and the like, and notify the UE on a timely basis. For example, multiple tables are configured in advance for the network or cell side, and when the tables are used, which table is effective may be learned by the UE in a signaling-triggered manner.

It should be additionally noted that, in this embodiment of the present invention, because the LTE device sends the first signal only after seizing an opportunity to use a spectrum, the start position of the first signal is related to a time point at which the LTE device seizes the opportunity to use the spectrum, and may be further related to a time granularity of a CCA performed by the LTE device. For example, if a time of a CCA performed by the LTE device is an OFDM symbol, preferentially, to simplify a system design and enable the LTE device to start to perform a CCA at a boundary of each OFDM symbol, once the LTE device seizes an opportunity to use a spectrum resource on the unlicensed spectrum, a start time point of data transmission on the unlicensed spectrum may start from the boundary of the OFDM symbol. Correspondingly, the UE may also detect the first signal by detecting symbols one by one on the boundary of the OFDM symbol. For another example, if a time of a CCA performed by the LTE device is a fractional OFDM such as a ¼ OFDM, to simplify a system design, the LTE device may also divide an OFDM symbol into four equal parts by using an OFDM symbol boundary, where each equal part corresponds to a time of a CCA. In this case, once the LTE device seizes an opportunity to use the unlicensed spectrum, the LTE device may start to perform data transmission on a time position of a fractional OFDM. An advantage of using a length of a fractional OFDM lies in that, implementation complexity of the UE may be reduced, because the UE may receive, by sampling, a signal carried in a position of a fractional OFDM symbol, namely, a fractional OFDM symbol, sent on the unlicensed spectrum, or further detect a signal carried in a position of a fractional OFDM symbol, namely, a fractional OFDM symbol, sent on the unlicensed spectrum. If the UE side learns the OFDM symbol boundary of the unlicensed spectrum, the UE side may learn a possible start time point of data on the unlicensed spectrum. For another example, a time of a CCA performed by the LTE device may also be any time less than a length of one OFDM symbol, and the foregoing process is also effective. In summary, if a length of a CCA performed by the LTE device and a boundary of the CCA performed when the LTE device preempts the unlicensed spectrum may be learned by another LTE device (or in a broader sense, another device working on the unlicensed spectrum) that detects whether there is data transmission on the unlicensed spectrum, this helps the another LTE device that detects whether there is data transmission on the unlicensed spectrum to determine a possible start position for detecting the first signal, or a possible start time point of data transmission on the unlicensed spectrum. For example, herein the LTE device may be an entity that controls the first cell in this embodiment of the present invention, and the another LTE device is UE in this embodiment of the present invention. To reduce detection complexity on the LTE device, the LTE device may learn, in advance, information used for reducing blind detection, including at least one of the following: the length of the CCA performed when the LTE device preempts the unlicensed spectrum, the boundary (for example, an OFDM symbol boundary, or a fractional OFDM symbol boundary in an OFDM symbol) of the CCA performed by the LTE device, or the like, a data transmission unit after the LTE device preempts the unlicensed spectrum, a possible start position of data transmission, a possible start position of the first signal, a position of the second signal, or a possible start position of the second signal. The information may be learned by the UE in a manner of predefinition, standard specification, network configuration, or signaling notification. In the signaling notification manner, the signaling may be carried on the unlicensed spectrum, or may be carried on the licensed spectrum. To reduce a quantity of blind detection by the UE and power consumption of the UE, OFDM symbol alignment (or symbol boundary alignment), timeslot alignment (or timeslot boundary alignment), subframe alignment (subframe boundary alignment), radio frame alignment (or radio frame boundary alignment), or super frame alignment (or super frame boundary alignment) may be performed on the unlicensed spectrum and the licensed spectrum. Time unit indexes of the unlicensed spectrum and the licensed spectrum may be different or may be the same. For example, a first OFDM symbol on the unlicensed spectrum corresponds to a second OFDM symbol on the licensed spectrum.

The foregoing embodiments in FIG. 3 to FIG. 10 may be independent of each other, or may be mutually combined or mutually referenced. For example, parameters of a same type described in different embodiments such as X, Y, Z, or M may use a same value or structure, or may use different values or structures. An embodiment obtained after the combination also falls within the scope of the embodiments of the present invention.

Figure 11:
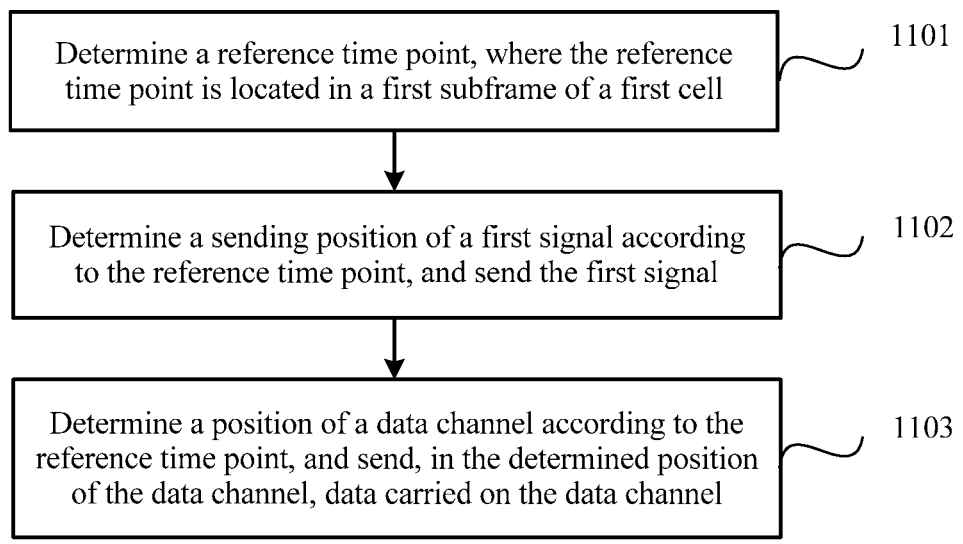
FIG. 11 is a schematic flowchart of a data transmission method according to another embodiment of the present invention.

FIG. 11 is a schematic flowchart of a data transmission method according to another embodiment of the present invention. The method in FIG. 11 is performed by a transmit end (for example, an LTE device, such as an LTE base station or UE).

1101. Determine a reference time point, where the reference time point is located in a first subframe of a first cell.

1102. Determine a sending position of a first signal according to the reference time point, and send the first signal in the sending position of the first signal.

1103. Determine a position of a data channel according to the reference time point, and send the data channel in the determined position of the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, system overheads are reduced and spectral usage efficiency is improved.

It should be noted that, similar attributes such as "first", "second", and "third" before terms in the specification of the present invention are not used to limit a sequence of the terms, but used only for distinguishing. For example, "first signal" and "second signal" mean that the two signals may represent different signal carriers. In other words, the two signals may also represent a same signal carrier, but anyway, the two signals do not mean that the first signal is located before the second signal in time. If a sequence relationship exists definitely, it is particularly pointed out in the specification of the present invention.

The first cell may be a cell on an unlicensed spectrum. The first signal may be used to indicate that a transmit end has preempted a spectrum resource of the first cell on the unlicensed spectrum. A preemption operation in this embodiment of the present invention may include a preemption operation performed according to a backoff process in FIG. 1, or may include preemption operations in other forms, for example, an unlicensed spectrum resource pattern (pattern) preset according to a protocol specification. For example, the first signal may indicate, to a receive end in an explicit or implicit manner, that the transmit end has preempted a spectrum resource on the unlicensed spectrum. In an embodiment, the explicit manner may be that the first signal may carry a specific flag (flag) field or a similar indication field, and different flag values indicate whether an unlicensed spectrum resource is preempted. In another embodiment, the implicit manner may be that sending the first signal or not is used to indicate whether the transmit end has preempted an unlicensed spectrum resource. For example, an action of sending the first signal indicates that the transmit end has preempted an unlicensed spectrum resource. In addition, the first signal may be used for other purposes, for example, used for synchronizing or transmitting other useful information.

The first cell in this embodiment of the present invention may be a cell deployed on the unlicensed spectrum. One of functions of the first signal is that the receive end determines, by detecting the first signal, whether the first cell that sends the first signal has data transmission on the spectrum on which the first cell is deployed. For example, when the first cell is deployed on the unlicensed spectrum, the receive end may determine, by detecting the first signal, whether the first cell starts to use the unlicensed spectrum or whether the first cell seizes an opportunity to use a spectrum resource on the unlicensed spectrum. The first signal may be a reference signal, for example, may be one of the following reference signals: a PSS, an SSS, a CRS, a CSI-RS, a PRS, a DRS, a DMRS, or a UE specific reference signal used for PDSCH demodulation. In another embodiment, the first signal in this embodiment of the present invention may also be a channel carrying data, for example, one of the following channels: a PDCCH, a PDSCH, an EPDCCH, or the like.

The first signal includes or carries a first sequence. For example, the first sequence has N different sequence forms, and no matter which sequence form is used for the first sequence, the first sequence may be included in the first signal. UE may determine, by detecting the first signal, the first sequence (for example, the sequence form of the first sequence) included in the first signal, and this may be referred to as the first sequence of the detected first signal. More specifically, for example, a PSS in an existing LTE system is used as the first signal; in this case, the first sequence may be Zadoff-Chu sequences forming the PSS; and the UE may determine, by detecting the PSS, which Zadoff-Chu sequence, namely, which first sequence, is carried in the detected PSS. For another example, an SSS in the existing LTE system is used as the first signal; in this case, the first sequence may be 168 sequences forming the SSS, and any one in the 168 sequences is a combination of two binary sequences having a length of 31. In addition, the first signal may also be a channel including or carrying the first sequence. In this embodiment of the present invention, the term signal or channel may indicate a carrier that is used to carry specific information or data and occupies a specific time-frequency resource.

The data channel may be independent of the first signal, for example, may be sent after the first signal. The data channel and the first signal may also occupy a same time resource, for example, are multiplexed on the time resource in orthogonal mode such as frequency division, space division, or code division. The data channel may be used to carry control data and/or service data. An example of the control data includes but is not limited to data carried by a PDCCH, an EPDCCH, a PBCH, a PHICH, or a PCFICH. An example of the service data includes but is not limited to data carried by a PDSCH or a PMCH.

In addition, in this embodiment of the present invention, a detection operation of the receive end on the first signal may be real-time blind detection, for example, detecting whether the first signal exists during signal reception, or may be first buffering the first signal and then detecting the first signal.

In the following embodiment, for ease of description, a case in which the transmit end is an LTE base station and the receive end is LTE UE is mainly used as an example for description, that is, a case in which the first signal and the data channel are a downlink signal and channel is used as an example for description. A person skilled in the art easily understands that a case in which the first signal and the data channel are an uplink signal and channel may be designed or modified similarly. Such a design or modification still falls within the scope of this embodiment of the present invention.

To implement data communication between the first cell and the UE on the unlicensed spectrum, once the first cell seizes an opportunity to use the unlicensed spectrum, before the first cell performs control data and/or service data transmission with the UE, the first cell may first send other control information used for detecting control data and/or service data, or before the first cell performs control data and/or service data communication with the UE, the UE needs to first learn other control information used for detecting control data and/or service data. For example, the other control information may include information that enables the UE to determine that the first cell seizes an opportunity to use the unlicensed spectrum, a cell identity of the first cell, synchronization information of the first cell, a public land mobile network (Public Lands Mobile Network, PLMN) identifier of the first cell, or more generally, necessary control information supporting data transmission in the current LTE system, for example, information carried in a PBCH or information carried in a system information block (System Information Block, SIB). The other control information may be carried in a signal and/or a channel. For example, the synchronization information of the first cell may be carried by a synchronization signal sent by the first cell. In this embodiment of the present invention, a carrier carrying the other control information is referred to as a second signal, or may be referred to as a second channel. For example, the second signal may be in a form of a preamble (preamble), and the preamble carries the other control information. However, the form or a specific name of the second signal is not limited in this embodiment of the present invention. In this embodiment of the present invention, the term "signal" is mainly used for description. However, this may also be extended to a case in which the term "channel" is used, and the extension falls within the scope of this embodiment of the present invention. The second signal sent by the first cell may occupy multiple time units in time. Herein the time unit may be a length of one OFDM symbol, or may occupy a length of a fractional OFDM symbol, or may be another length representation form related to a length of an OFDM symbol, for example, a reciprocal Ts of a sampling rate, where 15360*Ts=0.5 milliseconds. To implement normal data communication between the first cell and the UE on the unlicensed spectrum, from a perspective of a synchronization requirement meeting normal data communication, the second signal may occupy X OFDM symbols in time, where X may be any positive integer. For example, assuming that X is set to 4 to implement a requirement of frequency synchronization between the first cell and the UE on the unlicensed spectrum, a signal carried by a first OFDM symbol may enable the UE to learn whether the first cell has seized an opportunity to use a spectrum resource on the unlicensed spectrum. In this case, the UE may learn, by detecting energy of the first OFDM symbol or parsing (demodulating) the signal carried by the first OFDM, whether the first cell has seized an opportunity to use a spectrum resource on the unlicensed spectrum. Certainly, the time length occupied by the second signal in time may be determined according to a met function provided by the second signal.

The first signal may be a part of the second signal, or may be just the second signal. For example, the first signal may include only the first OFDM symbol of the second signal in time. The UE may determine, by detecting the first signal, whether the first cell has seized an opportunity to use a spectrum resource on the unlicensed spectrum.

Correspondingly, the reference time point and a length of the second signal are then determined according to the first sequence of the detected first signal. For another example, the first signal is just the second signal. The first sequence of the detected first signal may include a detected signal carrying the first sequence, where the signal carrying the first sequence is a part of the first signal.

The data transmission method performed by the transmit end is hereinafter described in more detail with reference to specific embodiments. It should be noted that, for brevity, in the following embodiments, a process same as or corresponding to that in the foregoing embodiments in FIG. 2 to FIG. 10 is not described again.

Optionally, in an embodiment, when determining the reference time point in step 1101, the transmit end may determine the reference time point according to an index of a symbol closest to a time point at which a spectrum resource of the first cell is preempted, as described in the embodiments in FIG. 3a and FIG. 3b. Herein the symbol index may also be replaced with other forms such as a fractional symbol index or an integer multiple of a reciprocal of a sampling rate. Embodiments with such replacements all fall within the scope of this embodiment of the present invention. In addition, in a time period between the foregoing time point and the reference time point, the transmit end may send a reservation signal (padding).

Optionally, in an embodiment, when determining the reference time point in step 1101, the transmit end may determine the reference time point according to an index of a symbol that is in a second cell and closest to a time point at which a spectrum resource of the first cell is preempted. Herein the second cell and the first cell are deployed on different spectrum resources. For example, the first cell may be the unlicensed spectrum, and the second cell may be a licensed spectrum or other reference time sources. Herein the symbol index may also be replaced with other forms such as a fractional symbol index or an integer multiple of a reciprocal of a sampling rate. Embodiments with such replacements all fall within the scope of this embodiment of the present invention. In addition, in a time period between the foregoing time point and the reference time point, the transmit end may send a reservation signal (padding).

Optionally, in another embodiment, the first signal may include or carry the first sequence. In this case, the transmit end may further determine the first sequence according to the reference time point. For example, the transmit end may determine the first sequence according to a one-to-one correspondence between sequence information of the first sequence and the reference time point. In other words, a one-to-one correspondence may exist between the sequence information of the first sequence and the reference time point (for example, in a form of a table). This helps to determine the corresponding sequence information of the first sequence according to the reference time point.

Optionally, in another embodiment, for example, as shown in FIG. 4*a* and FIG. 4*b*, when the position of the data channel is determined according to the reference time point in step 1103, if a time length between the reference time point and an end boundary of the first subframe is not less than X1, it may be determined that the position of the data channel is located in the first subframe, where X1 is a time length that is not less than 0.

Optionally, in another embodiment, for example, as shown in FIG. 4*a* and FIG. 4*b*, the transmit end may further determine that a time length of a second signal is M1, where the second signal includes the first signal, and M1 is a minimum time length of the second signal.

Optionally, in another embodiment, as shown in FIG. 5, when the position of the data channel is determined according to the reference time point in step 1103, if a time length between the reference time point and an end boundary of the first subframe is less than X2, it is determined that the position of the data channel is located in a second subframe, where the second subframe is a next subframe adjacent to the first subframe.

Optionally, in another embodiment, for example, as shown in FIG. 6, when the position of the data channel is determined according to the reference time point in step 1103, if a time length between the reference time point and an end boundary of the first subframe is less than X2, it is determined that the position of the data channel is located in a third subframe, where the third subframe is a next subframe that is in the second cell and adjacent to the first subframe in time. The second cell and the first cell are deployed on different spectrum resources. X2 is a time length that is not less than 0.

Optionally, in another embodiment, for example, as shown in FIG. 6, if the time length between the reference time point and the end boundary of the first subframe is not less than Y1, it is determined that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \leq i < n$, $L_i < L_{i+1}$, and Y1 is a time length that is not equal to X2 and not less than 0.

Optionally, in another embodiment, for example, as shown in FIG. 7, if the time length between the reference time point and the end boundary of the first subframe is less than Y2, it is determined that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \leq i < n$, $L_i' < L_{i+1}'$, and Y2 is a time length that is not equal to X2 and not less than 0.

Optionally, in another embodiment, for example, as shown in FIG. 8, if the time length between the reference time point and the end boundary of the first subframe is less than Y3, it is determined that a time length of a second signal is Z3, where the second signal includes the first signal, Z3 is less than M2, an end time position of the second signal is located at the end boundary of the first subframe, M2 is a minimum time length of the second signal, and Y3 is a time length that is not equal to X2 and not less than 0.

Optionally, in another embodiment, for example, as shown in FIG. 9, when the position of the data channel is determined according to the reference time point in step 1103, if the time length between the reference time point and the end boundary of the first subframe is less than X3, and the time length between the reference time point and the end boundary of the first subframe is greater than Y4, it is determined that the position of the data channel is located in the first subframe, where X3 and Y4 are time lengths that are not less than 0, and Y4 is not greater than X3.

Optionally, in another embodiment, for example, as shown in FIG. 6, FIG. 7, and FIG. 10, the data channel may carry data scheduling information of a second subframe of the first cell, where the second subframe is a next subframe adjacent to the first subframe.

Optionally, in another embodiment, a correspondence exists between the reference time point and the position of the data channel, where each reference time point corresponds to one index, and each index corresponds to one position of the data channel, for example, as described in the foregoing Table 2 to Table 4.

Optionally, in another embodiment, the position of the data channel may include at least one of the following positions: a position of a control data channel or a position of a service data channel.

Therefore, in this embodiment of the present invention, the determining a position of a data channel according to the reference time point may include at least one of the following manners:

determining that the position of the data channel and the reference time point are in a same subframe;

determining that the position of the data channel and the reference time point are in different subframes;

determining that the position of the data channel and the reference time point are in different cells;

determining that the position of the control data channel and the reference time point are in a same subframe, and that the control data channel is used for scheduling a service data channel of the first subframe;

determining that the position of the control data channel and the reference time point are in a same subframe, and that the control data channel may be used for cross-subframe scheduling, that is, the control data channel may be used for scheduling a service data channel of a non-first subframe, for example, a service data channel of another subframe after the first subframe, where the another subframe and the first subframe may be in a same cell;

determining that the position of the control data channel and the reference time point are in a same subframe, and that the control data channel may be used for first-subframe scheduling and cross-subframe scheduling simultaneously;

determining that a part of positions of the control data channel and the reference time point are in a same subframe, and that another part of positions of the control data channel and the reference time point are in different subframes, and that the control data channel may be used for cross-subframe scheduling, that is, the control data channel may be used for scheduling a service data channel of a non-first subframe, for example, a service data channel of another subframe after the first subframe, where the another subframe and the first subframe may be in a same cell; assuming that the control data channel occupies three OFDM symbols in time, first two OFDM symbols of the control data channel may be in the first subframe, the last OFDM symbol may be in a next subframe that is in the first cell and adjacent to the first subframe, and the control data channel may indicate a service data transmission format of the next subframe that is in the first cell and adjacent to the first subframe;

determining that the position of the control data channel and the reference time point are in different subframes; or determining that the position of the service data channel and the reference time point are in a same subframe or in different subframes, where information used for indicating a transmission format of the service data channel may be carried by the control data channel, or is learned by the cell and/or the UE in a manner of predefinition or advance indication by using the licensed spectrum.

In this embodiment of the present invention, to support the UE in detecting a data channel and especially a control data channel in different cells, dynamic signaling may be used to instruct the UE to perform cross-carrier detection, so that the UE can quickly switch from detecting a channel of the first cell to detecting a channel of the second cell.

In this embodiment of the present invention, PDCCH formats detected by the UE may be a set of some PDCCH formats, or all PDCCH formats supported by the LTE system. The PDCCH format may be effective on specific UE, or may be effective on a specific group of UEs, for example, UE capable of data communication on the unlicensed spectrum, or may be effective on all UEs accessing a cell. A PDSCH format detected by the UE may be indicated by the PDCCH. When a data transmission time is less than 1 ms, data transmission of the UE may be supported by rate matching. The PDCCH format and a rate matching rule may be learned by the UE in a manner of signaling notification, predefinition, network configuration, or the like.

Figure 12:
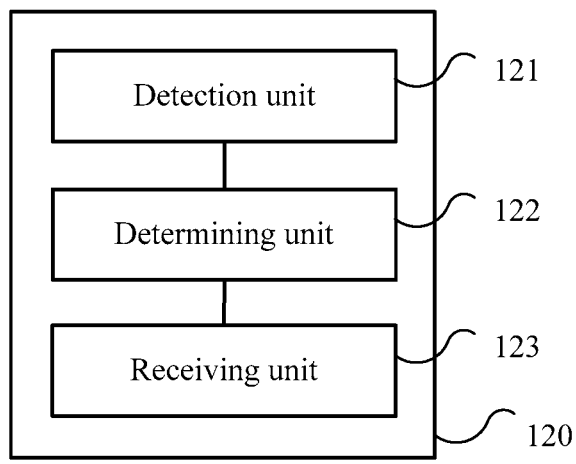
FIG. 12 is a schematic block diagram of a data transmission device according to an embodiment of the present invention.

FIG. 12 is a schematic block diagram of a data transmission device according to an embodiment of the present invention. As shown in FIG. 12, the data transmission device 120 in FIG. 12 includes a detection unit 121, a determining unit 122, and a receiving unit 123.

The detection unit 121 is configured to detect a first signal in a first cell.

The determining unit 122 is configured to determine a reference time point according to a first sequence of the detected first signal, where the reference time point is located in a first subframe of the first cell.

The determining unit 122 is further configured to determine a position of a data channel according to the determined reference time point.

The receiving unit 123 is configured to receive, according to the position of the data channel, control data and/or service data carried on the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

Each unit of the data transmission device 120 may implement each process of the method in FIG. 2 to FIG. 10. Details are not described again for avoiding repetition.

Optionally, in an embodiment, the determining unit 122 may determine the reference time point according to a one-to-one correspondence between sequence information of the first sequence and the reference time point.

Optionally, in another embodiment, the determining unit 122 may determine the reference time point according to an index of a symbol that is in the first cell and closest to a position of the first sequence.

Optionally, in another embodiment, the determining unit 122 may determine the reference time point according to an index of a symbol that is in a second cell and closest to a position of the first sequence, where the second cell and the first cell are deployed on different spectrum resources.

Optionally, in another embodiment, the position of the first sequence includes a start time position of the first sequence or an end time position of the first sequence.

Optionally, in another embodiment, if a time length between the determined reference time point and an end boundary of the first subframe is not less than X1, the determining unit 122 may determine that the position of the data channel is located in the first subframe, where X1 is a time length that is not less than 0.

Optionally, in another embodiment, the determining unit 122 may further determine that a time length of a second signal is M1, where the second signal includes the first signal, and M1 is a minimum time length of the second signal.

Optionally, in another embodiment, if a time length between the determined reference time point and an end boundary of the first subframe is less than X2, the determining unit 122 may determine that the position of the data channel is located in a second subframe, where the second subframe is a next subframe adjacent to the first subframe; or if a time length between the determined reference time point and an end boundary of the first subframe is less than X2, the determining unit 122 may determine that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

Optionally, in another embodiment, if the time length between the determined reference time point and the end boundary of the first subframe is not less than Y1, the determining unit 122 may determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \leq i < n$, $L_i < L_{i+1}$, and Y1 is a time length that is not equal to X2 and not less than 0.

Optionally, in another embodiment, if the time length between the determined reference time point and the end boundary of the first subframe is less than Y2, the determining unit 122 may determine that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \leq i < n$, $L_i' < L_{i+1}'$, and Y2 is a time length that is not equal to X2 and not less than 0.

Optionally, in another embodiment, if the time length between the determined reference time point and the end boundary of the first subframe is less than Y3, the determining unit 122 may determine that a time length of a second signal is Z3, where the second signal includes the first signal, Z3 is less than M2, an end time position of the second signal is located at the end boundary of the first subframe, M2 is a preset minimum time length of the second signal, and Y3 is a time length that is not equal to X2 and not less than 0.

Optionally, in another embodiment, if a time length between the determined reference time point and an end boundary of the first subframe is less than X3, and the time length between the determined reference time point and the end boundary of the first subframe is greater than Y4, the determining unit 122 may determine that the position of the data channel is located in the first subframe, where X3 and Y4 are time lengths that are not less than 0, and Y4 is not greater than X3.

Optionally, in another embodiment, the data channel may carry data scheduling information of a second subframe of the first cell, where the second subframe is a next subframe adjacent to the first subframe.

Optionally, in another embodiment, a correspondence exists between the reference time point and the position of the data channel, each reference time point corresponds to one index, and each index corresponds to one position of the data channel.

Optionally, in another embodiment, the position of the data channel may include at least one of the following positions: a position of a control data channel or a position of a service data channel.

Optionally, in another embodiment, the first cell may be a cell on an unlicensed spectrum.

Figure 13:
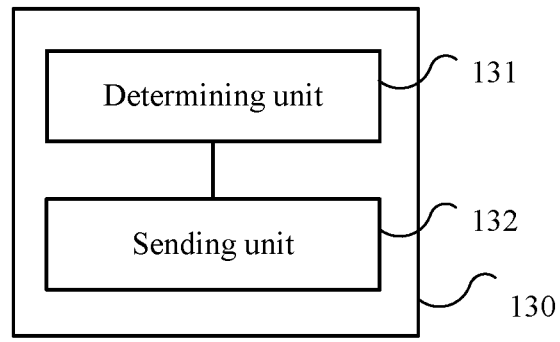
FIG. 13 is a schematic block diagram of a data transmission device according to another embodiment of the present invention.

FIG. 13 is a schematic block diagram of a data transmission device according to an embodiment of the present invention. As shown in FIG. 13, the data transmission device 130 includes a determining unit 131 and a sending unit 132.

The determining unit 131 is configured to determine a reference time point, where the reference time point is located in a first subframe of a first cell.

The determining unit 131 is further configured to determine a sending position of a first signal according to the reference time point.

The sending unit 132 is configured to send the first signal in the sending position of the first signal.

The determining unit 131 is further configured to determine a position of a data channel according to the reference time point.

The sending unit 132 is further configured to send, in the position of the data channel, control data and/or service data carried on the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

Each unit of the data transmission device 130 may implement each process of the method in FIG. 3 to FIG. 11. Details are not described again for avoiding repetition.

Optionally, in an embodiment, the determining unit 131 may determine the reference time point according to an index of a symbol closest to a time point at which a spectrum resource of the first cell is preempted.

Optionally, in another embodiment, the determining unit 131 may determine the reference time point according to an index of a symbol that is in a second cell and closest to a time point at which a spectrum resource of the first cell is preempted, where the second cell and the first cell are deployed on different spectrum resources.

Optionally, in another embodiment, the first signal may include or carry a first sequence; and the determining unit 131 may determine the first sequence according to the reference time point.

Optionally, in another embodiment, the determining unit 131 may determine the first sequence according to a one-to-one correspondence between sequence information of the first sequence and the reference time point.

Optionally, in another embodiment, if a time length between the reference time point and an end boundary of the first subframe is not less than X1, the determining unit 131 may determine that the position of the data channel is located in the first subframe, where X1 is a time length that is not less than 0.

Optionally, in another embodiment, the determining unit 131 may further determine that a time length of a second signal is M1, where the second signal includes the first signal, and M1 is a minimum time length of the second signal.

Optionally, in another embodiment, if a time length between the reference time point and an end boundary of the first subframe is less than X2, the determining unit 131 may determine that the position of the data channel is located in a second subframe, where the second subframe is a next subframe adjacent to the first subframe.

Alternatively, if a time length between the reference time point and an end boundary of the first subframe is less than X2, the determining unit 131 may determine that the position of the data channel is located in a third subframe, where the third subframe is a next subframe that is in the second cell and adjacent to the first subframe in time, and the second cell and the first cell are deployed on different spectrum resources. X2 is a time length that is not less than 0.

Optionally, in another embodiment, if the time length between the reference time point and the end boundary of the first subframe is not less than Y1, the determining unit 131 may determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, ∀i, 1≤i<n, $L_i < L_{i+1}$, and Y1 is a time length that is not equal to X2 and not less than 0.

Optionally, in another embodiment, if the time length between the reference time point and the end boundary of the first subframe is less than Y2, the determining unit 131 may determine that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, ∀i, 1≤i<n, $L_i' < L_{i+1}'$, and Y2 is a time length that is not equal to X2 and not less than 0.

Optionally, in another embodiment, if the time length between the reference time point and the end boundary of the first subframe is less than Y3, the determining unit 131 may determine that a time length of a second signal is Z3, where the second signal includes the first signal, Z3 is less than M2, an end time position of the second signal is located at the end boundary of the first subframe, M2 is a minimum time length of the second signal, and Y3 is a time length that is not equal to X2 and not less than 0.

Optionally, in another embodiment, if a time length between the reference time point and an end boundary of the first subframe is less than X3, and the time length between the reference time point and the end boundary of the first subframe is greater than Y4, the determining unit 131 may determine that the position of the data channel is located in the first subframe, where X3 and Y4 are time lengths that are not less than 0, and Y4 is not greater than X3.

Optionally, in another embodiment, the data channel carries data scheduling information of a second subframe of the first cell, where the second subframe is a next subframe adjacent to the first subframe.

Optionally, in another embodiment, a correspondence may exist between the reference time point and the position of the data channel, each reference time point corresponds to one index, and each index corresponds to one position of the data channel.

Optionally, in another embodiment, the position of the data channel may include at least one of the following positions: a position of a control data channel or a position of a service data channel.

Optionally, in another embodiment, the first cell may be a cell on an unlicensed spectrum.

Figure 14:
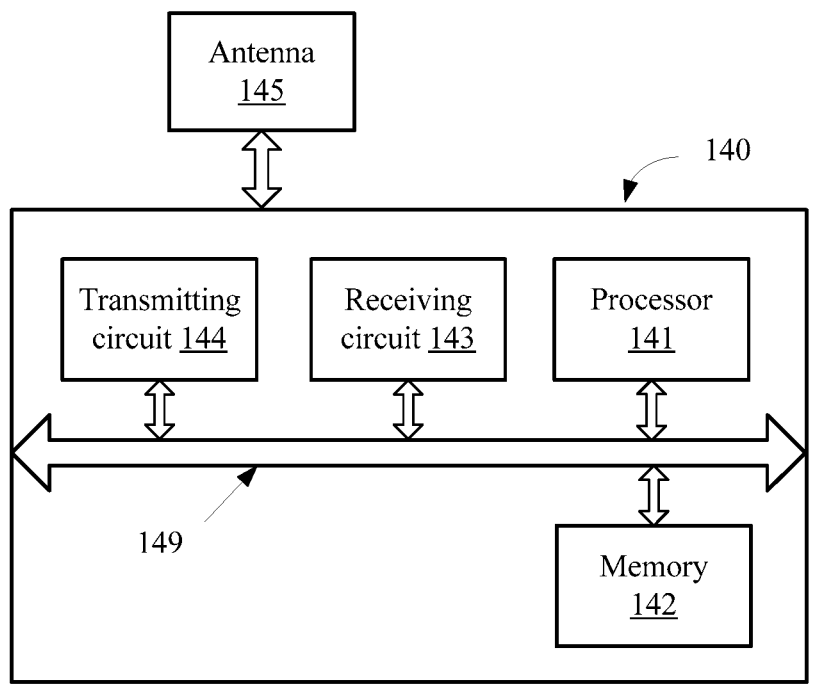
FIG. 14 is a schematic block diagram of a communications device according to an embodiment of the present invention.

FIG. 14 is a schematic block diagram of a communications device according to another embodiment of the present invention. As shown in FIG. 14, the communications device 140 includes a processor 141, a memory 142, a receiving circuit 143, and a transmitting circuit 144. The processor 141, the memory 142, the receiving circuit 143, and the transmitting circuit 144 are connected by a system bus 149.

In addition, the communications device 140 may further include an antenna 145, and the like. The processor 141 controls an operation of the communications device 140. The memory 142 may include a read-only memory and a random access memory, and provide an instruction and data to the processor 141. A part of the memory 142 may further include a non-volatile random access memory (NVRAM). In a specific application, the transmitting circuit 144 and the receiving circuit 143 may be coupled to the antenna 145. Components in the communications device 140 are coupled together by using the bus system 149. The bus system 149 may further include a power bus, a control bus, and a status signal bus, in addition to a data bus. However, for clear description, various buses in the figure are marked as the bus system 149.

The processor 141 may be an integrated circuit chip and have a signal processing capability. The processor 141 may be a general purpose processor, a digital signal processor (DSP), an application-specific integrated circuit (ASIC), a field programmable gate array (FPGA), or another programmable logic device, discrete gate or transistor logic device, or discrete hardware component. The processor may implement or execute methods, steps, and logic block diagrams disclosed in the embodiments of the present invention. The general purpose processor may be a microprocessor, or the processor may be any conventional processor or the like. The processor 141 reads information in the memory 142, and controls each component of the modulation device 140 with reference to hardware of the processor 141.

The method in FIG. 2 to FIG. 10 may be implemented in the communications device 140 in FIG. 14, or the data transmission device in FIG. 12 may be implemented by the communications device 140 in FIG. 14. An example of the communications device 140 is user equipment or a base station. Details are not described again for avoiding repetition.

Specifically, the receiving circuit 143 may detect a first signal in a first cell. The processor 141 may determine a reference time point according to a first sequence of the detected first signal, where the reference time point is located in a first subframe of the first cell.

For example, the receiving circuit 143 may detect the first signal by detecting energy of the first signal. Alternatively, in another implementation manner, the receiving circuit 143 may simply buffer the first signal, and the processor 141 performs detection processing on the first signal.

The processor 141 may further determine a position of a data channel according to the determined reference time point.

The receiving unit 143 may receive, according to the position of the data channel, control data and/or service data carried on the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

Optionally, in an embodiment, the processor 141 may determine the reference time point according to a one-to-one correspondence between sequence information of the first sequence and the reference time point.

Optionally, in another embodiment, the processor 141 may determine the reference time point according to an index of a symbol that is in the first cell and closest to a position of the first sequence.

Optionally, in another embodiment, the processor 141 may determine the reference time point according to an index of a symbol that is in a second cell and closest to a position of the first sequence, where the second cell and the first cell are deployed on different spectrum resources.

Optionally, in another embodiment, the position of the first sequence includes a start time position of the first sequence or an end time position of the first sequence.

Optionally, in another embodiment, if a time length between the determined reference time point and an end boundary of the first subframe is not less than X1, the processor 141 may determine that the position of the data channel is located in the first subframe, where X1 is a time length that is not less than 0.

Optionally, in another embodiment, the processor 141 may further determine that a time length of a second signal is M1, where the second signal includes the first signal, and M1 is a minimum time length of the second signal.

Optionally, in another embodiment, if a time length between the determined reference time point and an end boundary of the first subframe is less than X2, the processor 141 may determine that the position of the data channel is located in a second subframe, where the second subframe is a next subframe adjacent to the first subframe; or if a time length between the determined reference time point and an end boundary of the first subframe is less than X2, the processor 141 may determine that the position of the data channel is located in a third subframe, where the third subframe is a next subframe that is in the second cell and adjacent to the first subframe in time, and the second cell and the first cell are deployed on different spectrum resources; where X2 is a time length that is not less than 0.

Optionally, in another embodiment, if the time length between the determined reference time point and the end boundary of the first subframe is not less than Y1, the processor 141 may determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \le i < n$, $L_i < L_{i+1}$, and Y1 is a time length that is not equal to X2 and not less than 0.

Optionally, in another embodiment, if the time length between the determined reference time point and the end boundary of the first subframe is less than Y2, the processor 141 may determine that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \le i < n$, $L_i' < L_{i+1}'$, and Y2 is a time length that is not equal to X2 and not less than 0.

Optionally, in another embodiment, if the time length between the determined reference time point and the end boundary of the first subframe is less than Y3, the processor 141 may determine that a time length of a second signal is Z3, where the second signal includes the first signal, Z3 is less than M2, an end time position of the second signal is located at the end boundary of the first subframe, M2 is a preset minimum time length of the second signal, and Y3 is a time length that is not equal to X2 and not less than 0.

Optionally, in another embodiment, if a time length between the determined reference time point and an end boundary of the first subframe is less than X3, and the time length between the determined reference time point and the end boundary of the first subframe is greater than Y4, the processor 141 may determine that the position of the data channel is located in the first subframe, where X3 and Y4 are time lengths that are not less than 0, and Y4 is not greater than X3.

Optionally, in another embodiment, the data channel may carry data scheduling information of a second subframe of the first cell, where the second subframe is a next subframe adjacent to the first subframe.

Optionally, in another embodiment, a correspondence exists between the reference time point and the position of the data channel, each reference time point corresponds to one index, and each index corresponds to one position of the data channel.

Optionally, in another embodiment, the position of the data channel may include at least one of the following positions: a position of a control data channel or a position of a service data channel.

Optionally, in another embodiment, the first cell may be a cell on an unlicensed spectrum.

Figure 15:
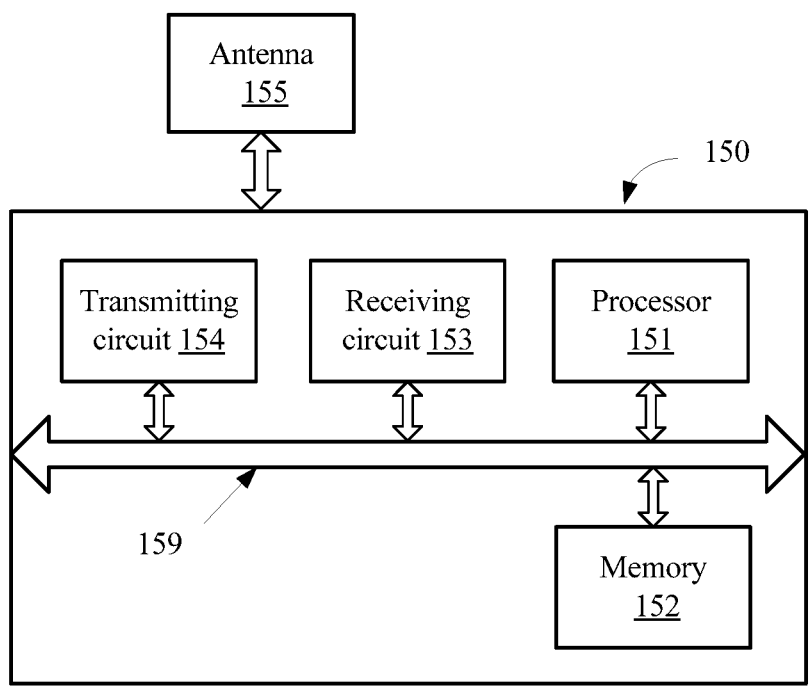
FIG. 15 is a schematic block diagram of a communications device according to another embodiment of the present invention.

FIG. 15 is a schematic block diagram of a communications device according to another embodiment of the present invention. As shown in FIG. 15, the communications device 150 includes a processor 151, a memory 152, a receiving circuit 153, and a transmitting circuit 154. The processor 151, the memory 152, the receiving circuit 153, and the transmitting circuit 154 are connected by a system bus 159.

In addition, the communications device 150 may further include an antenna 155, and the like. The processor 151 controls an operation of the communications device 150. The memory 152 may include a read-only memory and a random access memory, and provide an instruction and data to the processor 151. A part of the memory 152 may further include a non-volatile random access memory (NVRAM). In a specific application, the transmitting circuit 154 and the receiving circuit 153 may be coupled to the antenna 155. Components in the communications device 150 are coupled together by using the bus system 159. The bus system 159 may further include a power bus, a control bus, and a status signal bus, in addition to a data bus. However, for clear description, various buses in the figure are marked as the bus system 159.

The processor 151 may be an integrated circuit chip and have a signal processing capability. The processor 151 may be a general purpose processor, a digital signal processor (DSP), an application-specific integrated circuit (ASIC), a field programmable gate array (FPGA), or another programmable logic device, discrete gate or transistor logic device, or discrete hardware component. The processor may implement or execute methods, steps, and logic block diagrams disclosed in the embodiments of the present invention. The general purpose processor may be a microprocessor, or the processor may be any conventional processor or the like. The processor 151 reads information in the memory 152, and controls each component of the modulation device 150 with reference to hardware of the processor 151.

The method in FIG. 3 to FIG. 11 may be implemented in the communications device 150 in FIG. 15, or the data transmission device in FIG. 13 may be implemented by the communications device 150 in FIG. 15. An example of the communications device 150 is user equipment or a base station. Details are not described again for avoiding repetition.

Specifically, the processor 151 may determine a reference time point, where the reference time point is located in a first subframe of a first cell.

The processor 151 may further determine a sending position of a first signal according to the reference time point.

The transmitting circuit 154 may send the first signal in the sending position of the first signal.

The processor 151 may further determine a position of a data channel according to the reference time point.

The transmitting circuit 154 may further send, in the position of the data channel, control data and/or service data carried on the data channel.

In this embodiment of the present invention, a reference time point in a subframe is considered for determining a position of a data channel, and therefore, the data channel is received according to the position of the data channel. In comparison with a manner of starting data transmission only in a next subframe regardless of a time position in which an LTE device seizes a usage opportunity, spectrum resources of the subframe in which the reference time point is located can be fully used, and therefore, spectral usage efficiency is improved.

Optionally, in an embodiment, the processor 151 may determine the reference time point according to an index of a symbol closest to a time point at which a spectrum resource of the first cell is preempted.

Optionally, in another embodiment, the processor 151 may determine the reference time point according to an index of a symbol that is in a second cell and closest to a time point at which a spectrum resource of the first cell is preempted, where the second cell and the first cell are deployed on different spectrum resources.

Optionally, in another embodiment, the first signal may include or carry a first sequence; and the processor 151 may determine the first sequence according to the reference time point.

Optionally, in another embodiment, the processor 151 may determine the first sequence according to a one-to-one correspondence between sequence information of the first sequence and the reference time point.

Optionally, in another embodiment, if a time length between the reference time point and an end boundary of the first subframe is not less than X1, the processor 151 may determine that the position of the data channel is located in the first subframe, where X1 is a time length that is not less than 0.

Optionally, in another embodiment, the processor 151 may further determine that a time length of a second signal is M1, where the second signal includes the first signal, and M1 is a minimum time length of the second signal.

Optionally, in another embodiment, if a time length between the reference time point and an end boundary of the first subframe is less than X2, the processor 151 may determine that the position of the data channel is located in a second subframe, where the second subframe is a next subframe adjacent to the first subframe.

Alternatively, if a time length between the reference time point and an end boundary of the first subframe is less than X2, the processor 151 may determine that the position of the data channel is located in a third subframe, where the third subframe is a next subframe that is in the second cell and adjacent to the first subframe in time, and the second cell and the first cell are deployed on different spectrum resources. X2 is a time length that is not less than 0.

Optionally, in another embodiment, if the time length between the reference time point and the end boundary of the first subframe is not less than Y1, the processor 151 may determine that a time length of a second signal is Z1, where the second signal includes the first signal, Z1 belongs to a length set $\{L_1, L_2, \ldots L_n\}$, and an end time position of the second signal is located at the end boundary of the first subframe, where n is an integer that is not less than 1, $\forall i$, $1 \le i < n$, $L_i < L_{i+1}$, and Y1 is a time length that is not equal to X2 and not less than 0.

Optionally, in another embodiment, if the time length between the reference time point and the end boundary of the first subframe is less than Y2, the processor 151 may determine that a time length of a second signal is Z2, where the second signal includes the first signal, Z2 belongs to a length set $\{L_1', L_2', \ldots L_n'\}$, an end time position of the second signal is located in the second subframe of the first cell, and the second subframe is the next subframe adjacent to the first subframe, where n is an integer that is not less than 1, $\forall i$, $1 \le i < n$, $L_i' < L_{i+1}'$, and Y2 is a time length that is not equal to X2 and not less than 0.

Optionally, in another embodiment, if the time length between the reference time point and the end boundary of the first subframe is less than Y3, the processor 151 may determine that a time length of a second signal is Z3, where the second signal includes the first signal, Z3 is less than M2, an end time position of the second signal is located at the end boundary of the first subframe, M2 is a minimum time length of the second signal, and Y3 is a time length that is not equal to X2 and not less than 0.

Optionally, in another embodiment, if a time length between the reference time point and an end boundary of the first subframe is less than X3, and the time length between the reference time point and the end boundary of the first subframe is greater than Y4, the processor 151 may determine that the position of the data channel is located in the first subframe, where X3 and Y4 are time lengths that are not less than 0, and Y4 is not greater than X3.

Optionally, in another embodiment, the data channel carries data scheduling information of a second subframe of the first cell, where the second subframe is a next subframe adjacent to the first subframe.

Optionally, in another embodiment, a correspondence may exist between the reference time point and the position of the data channel, each reference time point corresponds to one index, and each index corresponds to one position of the data channel.

Optionally, in another embodiment, the position of the data channel may include at least one of the following positions: a position of a control data channel or a position of a service data channel.

Optionally, in another embodiment, the first cell may be a cell on an unlicensed spectrum.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission device, comprising:
   a processor; and
   a receiver,
   wherein the processor is configured to:
   detect a first signal sent on an unlicensed spectrum in a first cell, wherein the first signal indicates that a transmit end has preempted a spectrum resource of the first cell on the unlicensed spectrum;
   determine a reference time point according to a first sequence of the detected first signal, wherein the reference time point is located in a first subframe of the first cell, and wherein the first sequence indicates the reference time point of the first cell on the unlicensed spectrum; and
   determine a position of a data channel according to the determined reference time point;
   wherein to determine a position of a data channel according to the reference time point, the processor is further configured to:
     if a time length between the determined reference time point and an end boundary of the first subframe is less than X3, and the time length between the determined reference time point and the end boundary of the first subframe is greater than Y4, determine that the position of the data channel is located in the first subframe, wherein X3 and Y4 are time lengths that are not less than 0, and Y4 is not greater than X3;
     determine a position of a control data channel;
     determine a position of a service data channel; and
   at least one of:
     (a) determine that the position of the control data channel and the reference time point are in a same subframe and that the control data channel is used for scheduling the service data channel of the first subframe;
     (b) determine that the position of the control data channel and the reference time point are in a same subframe and that the control data channel may be used for scheduling the service data channel of anon-first subframe in a same cell as the first subframe; and
     (c) determine that the position of the control data channel and the reference time point are in a same subframe, and that the control data channel may be used for first subframe scheduling and cross-subframe scheduling simultaneously; and
   wherein the receiver is configured to receive, according to the position of the data channel, the control data channel and the service data channel within the data channel.

2. The data transmission device according to claim 1, wherein the processor is further configured to determine the reference time point according to a one-to-one correspondence between sequence information of the first sequence and the reference time point.

3. The data transmission device according to claim 1, wherein the processor is further configured to: if a time length between the determined reference time point and an end boundary of the first subframe is not less than X1, determine that the position of the data channel is located in the first subframe, wherein X1 is a time length that is not less than 0.

4. The data transmission device according to claim 1, wherein the processor is further configured to:
   if a time length between the determined reference time point and an end boundary of the first subframe is less than X2, determine that the position of the data channel is located in a second subframe, wherein the second subframe is a next subframe adjacent to the first subframe; or
   if a time length between the determined reference time point and an end boundary of the first subframe is less than X2, determine that the position of the data channel is located in a third subframe, wherein the third subframe is a next subframe that is in the second cell and adjacent to the first subframe in time, and the second cell and the first cell are deployed on different spectrum resources; wherein
   X5 is a time length that is not less than 0.

5. A data transmission device, comprising:
   a processor; and
   a transmitter,
   wherein the processor is configured to:
   determine a reference time point, wherein the reference time point is located in a first subframe of a first cell on an unlicensed spectrum;
   determine a sending position of a first signal according to the reference time point, wherein the first signal indicates that a transmit end has preempted a spectrum resource of the first cell on the unlicensed spectrum, and wherein the first signal comprises or carries a first sequence; and
   determine the first sequence according to the reference time point;

wherein the transmitter is configured to send the first signal in the sending position of the first signal;

wherein the processor is further configured to determine a position of a data channel according to the reference time point;

wherein to determine a position of a data channel according to the reference time point, the processor is further configured to:
- if a time length between the reference time point and an end boundary of the first subframe is less than X3, and the time length between the reference time point and the end boundary of the first subframe is greater than Y4, determine that the position of the data channel is located in the first subframe, wherein X3 and Y4 are time lengths that are not less than 0, and Y4 is not greater than X3;
- determine a position of a control data channel;
- determine a position of a service data channel; and
- at least one of:
  - (a) determine that the position of the control data channel and the reference time point are in a same subframe and that the control data channel is used for scheduling the service data channel of the first subframe;
  - (b) determine that the position of the control data channel and the reference time point are in a same subframe and that the control data channel may be used for scheduling the service data channel of a non-first subframe in a same cell as the first subframe; and
  - (c) determine that the position of the control data channel and the reference time point are in a same subframe, and that the control data channel may be used for first subframe scheduling and cross-subframe scheduling simultaneously; and wherein the transmitter is further configured to send, in the position of the data channel, the control data channel and the service data channel within the data channel.

6. The data transmission device according to claim 5, wherein the processor is further configured to: if a time length between the reference time point and an end boundary of the first subframe is not less than X1, determine that the position of the data channel is located in the first subframe, wherein X1 is a time length that is not less than 0.

7. The data transmission device according to claim 5, wherein the processor is configured further to:
- if a time length between the reference time point and an end boundary of the first subframe is less than X2, determine that the position of the data channel is located in a second subframe, wherein the second subframe is a next subframe adjacent to the first subframe; or
- if a time length between the reference time point and an end boundary of the first subframe is less than X2, determine that the position of the data channel is located in a third subframe, wherein the third subframe is a next subframe that is in the second cell and adjacent to the first subframe in time, and the second cell and the first cell are deployed on different spectrum resources; wherein X2 is a time length that is not less than 0.

8. A data transmission method, comprising:
detecting a first signal sent on an unlicensed spectrum in a first cell, wherein the first signal indicates that a transmit end has preempted a spectrum resource of the first cell on the unlicensed spectrum;

determining a reference time point according to a first sequence of the detected first signal, wherein the reference time point is located in a first subframe of the first cell, and wherein the first sequence indicates the reference time point of the first cell on the unlicensed spectrum;

determining a position of a data channel according to the determined reference time point; and receiving, according to the position of the data channel, control data and service data carried on the data channel, wherein the determining the position of the data channel according to the determined reference time point comprises:
- if a time length between the determined reference time point and an end boundary of the first subframe is less than X3, and the time length between the determined reference time point and the end boundary of the first subframe is greater than Y4, determining that the position of the data channel is located in the first subframe, wherein X3 and Y4 are time lengths that are not less than 0, and Y4 is not greater than X3;
- determining a position of a control data channel;
- determining a position of a service data channel; and
- at least one of:
  - (a) determining that the position of the control data channel and the reference time point are in a same subframe and that the control data channel is used for scheduling the service data channel of the first subframe;
  - (b) determining that the position of the control data channel and the reference time point are in a same subframe and that the control data channel may be used for scheduling the service data channel of a non-first subframe in a same cell as the first subframe; and
  - (c) determining that the position of the control data channel and the reference time point are in a same subframe, and that the control data channel may be used for first subframe scheduling and cross-subframe scheduling simultaneously, wherein the receiving, according to the position of the data channel, control data and service data carried on the data channel comprises receiving the control data channel and the service data channel within the data channel.

9. The method according to claim 8, wherein the determining a reference time point according to the detected first sequence comprises:
determining the reference time point according to a one-to-one correspondence between sequence information of the first sequence and the reference time point.

10. The method according to claim 8, wherein the determining a position of a data channel according to the determined reference time point comprises:
if a time length between the determined reference time point and an end boundary of the first subframe is not less than X1, determining that the position of the data channel is located in the first subframe, wherein X1 is a time length that is not less than 0.

11. The method according to claim 8, wherein the determining a position of a data channel according to the determined reference time point comprises:
if a time length between the determined reference time point and an end boundary of the first subframe is less than X2, determining that the position of the data channel is located in a second subframe, wherein the second subframe is a next subframe adjacent to the first subframe; or if a time length between the determined reference time point and an end boundary of the first subframe is less than X2, determining that the position of the data channel is located in a third subframe, wherein the third subframe is a next subframe that is in the second cell and adjacent to the first subframe in time, and the second cell and the first cell are deployed on different spectrum resources; wherein X2 is a time length that is not less than 0.

12. The method according to claim 8, wherein the detecting a first signal sent on an unlicensed spectrum in a first cell comprises determining whether the first cell starts to use the unlicensed spectrum.

13. The method according to claim 8, wherein the detecting a first signal sent on an unlicensed spectrum in a first cell comprises determining whether the first cell seizes an opportunity to use a spectrum resource on the unlicensed spectrum.

14. A data transmission method, comprising:
determining a reference time point, wherein the reference time point is located in a first subframe of a first cell on an unlicensed spectrum;
determining a sending position of a first signal according to the reference time point, wherein the first signal indicates that a transmit end has preempted a spectrum resource of the first cell on the unlicensed spectrum, and wherein the first signal comprises a first sequence;
determining the first sequence according to the reference time point;
sending the first signal in the sending position of the first signal; and
determining a position of a data channel according to the reference time point; and
sending, in the determined position of the data channel, control data and service data carried on the data channel,
wherein the determining the position of the data channel according to the reference time point comprises:
if a time length between the reference time point and an end boundary of the first subframe is less than X3, and the time length between the reference time point and the end boundary of the first subframe is greater than Y4, determining that the position of the data channel is located in the first subframe, wherein X3 and Y4 are time lengths that are not less than 0, and Y4 is not greater than X3;
determining a position of a control data channel;
determining a position of a service data channel; and
at least one of:
(a) determining that the position of the control data channel and the reference time point are in a same subframe and that the control data channel is used for scheduling the service data channel of the first subframe;
(b) determining that the position of the control data channel and the reference time point are in a same subframe and that the control data channel may be used for scheduling the service data channel of anon-first subframe in a same cell as the first subframe; and
(c) determining that the position of the control data channel and the reference time point are in a same subframe, and that the control data channel may be used for first subframe scheduling and cross-subframe scheduling simultaneously,
wherein the sending, in the determined position of the data channel, control data and service data carried on the data channel comprises sending the control data channel and the service data channel within the data channel.

15. The method according to claim 14, wherein the determining a position of a data channel according to the reference time point comprises:
if a time length between the reference time point and an end boundary of the first subframe is not less than X1, determining that the position of the data channel is located in the first subframe, wherein X1 is a time length that is not less than 0.

16. The method according to claim 14, wherein the determining a position of a data channel according to the reference time point comprises:
if a time length between the reference time point and an end boundary of the first subframe is less than X2, determining that the position of the data channel is located in a second subframe, wherein the second subframe is a next subframe adjacent to the first subframe; or
if a time length between the reference time point and an end boundary of the first subframe is less than X2, determining that the position of the data channel is located in a third subframe, wherein the third subframe is a next subframe that is in the second cell and adjacent to the first subframe in time, and the second cell and the first cell are deployed on different spectrum resources; wherein
X2 is a time length that is not less than 0.

* * * * *